United States Patent
Lim et al.

(10) Patent No.: US 10,455,524 B2
(45) Date of Patent: Oct. 22, 2019

(54) UPLINK TRANSMISSION POWER DETERMINATION METHOD AND WIRELESS DEVICE

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 15/556,605

(22) PCT Filed: Mar. 31, 2016

(86) PCT No.: PCT/KR2016/003331
§ 371 (c)(1),
(2) Date: Sep. 7, 2017

(87) PCT Pub. No.: WO2016/159685
PCT Pub. Date: Oct. 6, 2016

(65) Prior Publication Data
US 2018/0049139 A1   Feb. 15, 2018

Related U.S. Application Data

(60) Provisional application No. 62/146,390, filed on Apr. 12, 2015, provisional application No. 62/140,466, filed on Mar. 31, 2015.

(51) Int. Cl.
*H04W 52/02* (2009.01)
*H04W 52/14* (2009.01)
(Continued)

(52) U.S. Cl.
CPC ............. *H04W 52/30* (2013.01); *H04L 27/26* (2013.01); *H04L 27/34* (2013.01); *H04W 52/14* (2013.01);
(Continued)

(58) Field of Classification Search
None
See application file for complete search history.

(56) References Cited

U.S. PATENT DOCUMENTS

2012/0044898 A1* 2/2012 Ishii .................... H04W 52/146
370/329
2012/0327866 A1* 12/2012 Krishnamurthy ..... H04W 52/10
370/329
(Continued)

FOREIGN PATENT DOCUMENTS

KR    1020130063985    6/2013
KR    1020140111055    9/2014

OTHER PUBLICATIONS

Korean Intellectual Property Office Application No. 10-2017-7025545, Office Action dated Dec. 11, 2018, 5 pages.
(Continued)

*Primary Examiner* — Duc T Duong
(74) *Attorney, Agent, or Firm* — Lee Hong Degerman Kang Waimey

(57) ABSTRACT

A disclosure of the present specification provides a method for determining uplink transmission power by a wireless device. The transmission power determination method may comprise the steps of: determining whether transmission of uplink data uses 64 quadrature amplitude modulation (QAM) or not; determining whether transmission of the uplink data corresponds to multi-clustered transmission or not; determining whether transmission of the uplink data is to be performed through a single carrier or is to be performed through a plurality of carriers according to carrier
(Continued)

aggregation; and determining a maximum power reduction (MPR) value, which is to be applied to transmission of the uplink data, according to the determination results. Here, when transmission of the uplink data uses the 64 QAM, corresponds to the multi-clustered transmission, and is performed through the single carrier, a first MPR value may be determined; and, when transmission of the uplink data uses the 64 QAM, corresponds to the multi-clustered transmission, and is performed through the plurality of carriers, a second MPR value may be determined.

12 Claims, 25 Drawing Sheets

(51) Int. Cl.
  *H04W 52/30*   (2009.01)
  *H04W 72/04*   (2009.01)
  *H04L 27/34*   (2006.01)
  *H04L 27/26*   (2006.01)
  *H04W 52/36*   (2009.01)
  *H04W 52/34*   (2009.01)

(52) U.S. Cl.
  CPC ..... *H04W 52/367* (2013.01); *H04W 72/0413* (2013.01); *H04W 52/146* (2013.01); *H04W 52/34* (2013.01)

(56) References Cited

U.S. PATENT DOCUMENTS

| | | | |
|---|---|---|---|
| 2013/0039289 A1 | 2/2013 | Lee et al. | |
| 2013/0044621 A1* | 2/2013 | Jung | H04W 72/082 370/252 |
| 2013/0115997 A1* | 5/2013 | Immonen | H04W 52/367 455/522 |
| 2014/0044063 A1* | 2/2014 | Lim | H04W 52/34 370/329 |
| 2014/0092838 A1* | 4/2014 | Coan | H04W 52/327 370/329 |
| 2014/0126440 A1* | 5/2014 | Frank | H04W 52/146 370/311 |
| 2014/0269601 A1* | 9/2014 | Sagae | H04W 52/34 370/329 |
| 2014/0321304 A1* | 10/2014 | Yu | H04L 5/00 370/252 |
| 2015/0011236 A1* | 1/2015 | Kazmi | H04B 17/27 455/456.1 |

OTHER PUBLICATIONS

3rd Generation Partnership Project (3GPP), "Technical Specification Group Radio Access Network; Requirements for support of radio resource management (FDD) (Release 12)," 3GPP TS 25.133 V12.6.0, Dec. 2014, 366 pages.
Qualcomm, "Consideration of 4 Rx UE RF core requirements", 3GPP TSG RAN WG4 Meeting #74, R4-150974, Feb. 2015, 3 pages.
Japan Patent Office Application No. 2017-567033, Office Action dated Aug. 30, 2018, 4 pages.
3rd Generation Partnership Project (3GPP), "Technical Specification Group Radio Access Network; Evolved Universal Terrestrial Radio Access (E-UTRA); User Equipment (UE) radio transmission and reception (Release 12)," 3GPP TS 36.101 V12.6.0, Dec. 2014, 589 pages.
CMCC, "Discussion on UL 64QAM open issues", 3GPP TSG RAN WG4 Meeting #74, R4-150560, Feb. 2014, 2 pages.
Qualcomm, "EVM and MPR requirements in support of 64QAM UL", 3GPP TSG RAN WG4 Meeting #74, R4-150975, Feb. 2015, 5 pages.
PCT International Application No. PCT/KR2016/003331, International Search Report dated Jul. 8, 2016, 2 pages.
Huawei, et al., "New Work Item proposal: UE core requirements for uplink 64 QAM", RP-141925, 3GPP TSG RAN Meeting #66, Dec. 2014, 6 pages.
Huawei, et al., "Motivation of new Work Item proposal on UE core requirements for uplink 64 QAM", RP-141926, 3GPP TSG-RAN Meeting #66, Dec. 2014, 3 pages.
Huawei, "UE Core Requirements for Uplink 64 QAM", RP-150232, 3GPP TSG RAN meeting #67, Mar. 2015, 5 pages.

\* cited by examiner

FIG. 11
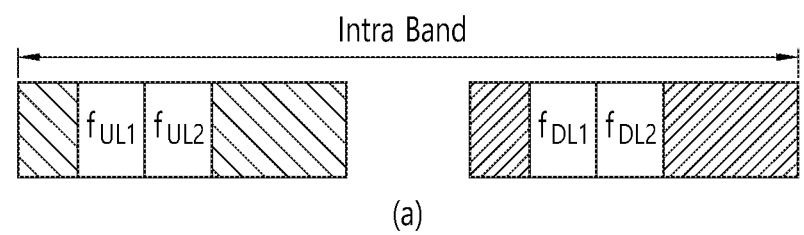
(a)
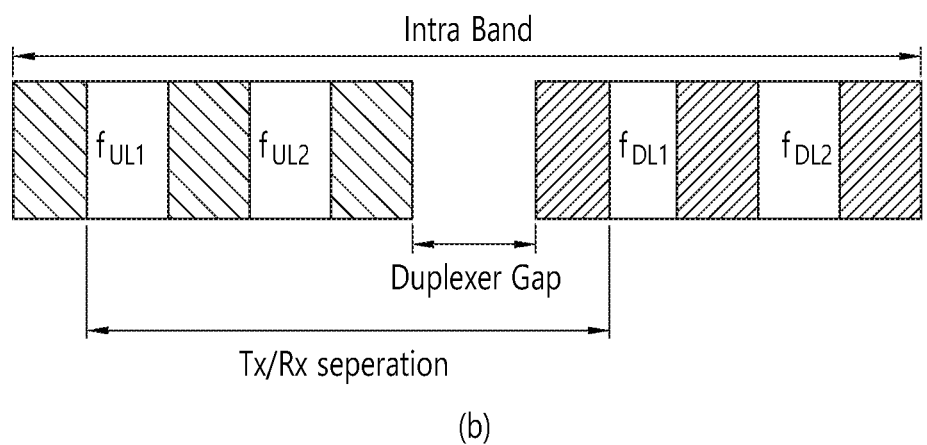
(b)

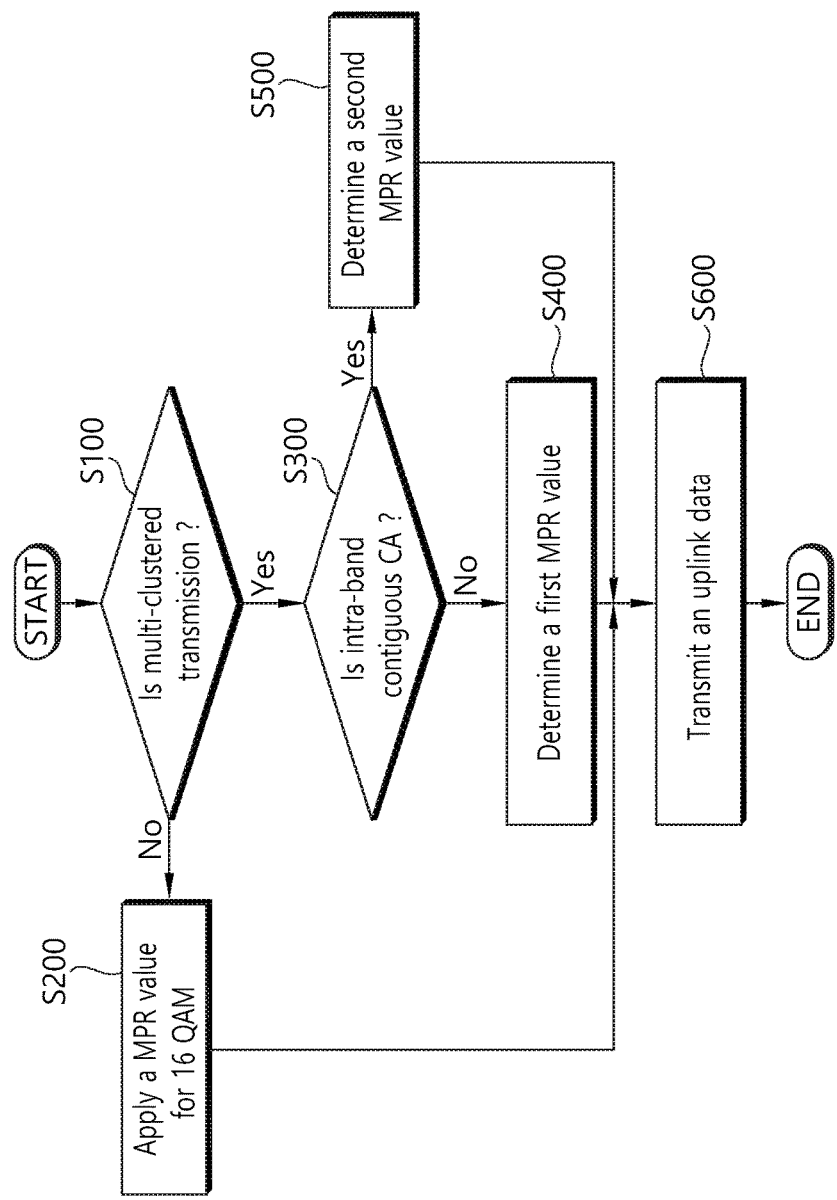

UPLINK TRANSMISSION POWER DETERMINATION METHOD AND WIRELESS DEVICE

CROSS-REFERENCE TO RELATED APPLICATIONS

This application is the National Stage filing under 35 U.S.C. 371 of International Application No. PCT/KR2016/003331, filed on Mar. 31, 2016, which claims the benefit of U.S. Provisional Applications No. 62/140,466, filed on Mar. 31, 2015 and 62/146,390, filed on Apr. 12, 2015, the contents of which are all hereby incorporated by reference herein in their entirety.

BACKGROUND OF THE INVENTION

Field of the Invention

The present invention relates to a method for determining uplink transmission power and a wireless device for performing such a method.

Related Art

3GPP (3rd Generation Partnership Project) LTE (long term evolution), an advanced version of UMTS (Universal Mobile Telecommunications System), is introduced in 3GPP release 8.

3GPP LTE adopts OFDMA (orthogonal frequency division multiple access) on downlink and SC-FDMA (Single Carrier-frequency division multiple access) on uplink. Knowledge of OFDM comes first for understanding OFDMA. OFDM may attenuate inter-slice boundary interference with low complexity and thus comes in use. OFDM converts data input in series into N parallel data items and transmits the converted data items on N orthogonal subcarriers. A subcarrier maintains frequency orthogonality. Meanwhile, OFDMA refers to a multiple access scheme that independently provides some of subcarriers available in a system adopting OFDM as its modulation scheme to each user, thus implementing multiple access.

FIG. 1 illustrates a wireless communication system.

As can be seen from FIG. 1, the wireless communication system includes at least one base station (BS) 20. Each base station 20 offers a communication service in a specific geographical area (generally denoted cell) 20a, 20b, and 20c.

At this time, communication from the base station to a terminal is denoted downlink (DL), and communication from the terminal to the base station is denoted uplink (UL).

If a plurality of base stations by service providers are located at respective geographical regions 20a, 20b, and 20c, the base stations may interfere with each other. In order to prevent the interference, the respective service providers may provide a service with different frequency bands.

However, when frequency bands of respective service operators are adjacent to each other, an interference problem still remains. The interference problem can be solved when transmission power is decreased or an actual frequency interval between adjacent bands is increased by limiting an amount of a transmission RB (resource block). However, when the transmission power is simply decreased or the transmission RB is limited, a service coverage is also decreased. Therefore, there is a need for a method of decreasing the transmission power to a proper level without causing an interference problem.

SUMMARY OF THE INVENTION

A disclosure of the present specification has been made in an effort to solve the aforementioned problem.

In a first aspect, there is provided a method for determining an uplink transmission power by a wireless device, the method comprising: determining whether uplink data transmission uses 64 QAM (Quadrature Amplitude Modulation); determining whether the uplink data transmission corresponds to multi-clustered transmission; determining whether the uplink data transmission should be performed on a single carrier or on a plurality of carriers using carrier aggregation (CA); and determining a maximum power reduction (MPR) value to be applied to the uplink data transmission based the determination results; wherein upon determination that the uplink data transmission uses the 64 QAM, and corresponds to the multi-clustered transmission and is performed on the single carrier, a first MPR value is determined as the maximum power reduction (MPR) value to be applied to the uplink data transmission; wherein upon determination that the uplink data transmission uses the 64 QAM and corresponds to the multi-clustered transmission and is performed on the plurality of carriers, a second MPR value is determined as the maximum power reduction (MPR) value to be applied to the uplink data transmission.

In one embodiment of the method, each of the first and second MPR values is in a range of 2.0 dB to 10.0 dB based on a resource block allocation ratio.

In one embodiment of the method, the first MPR value is determined based on CEIL $\{M_A, 0.5\}$, wherein, $M_A=10.0$, ; $0<A\leq0.1$ 11.75−17.5A, ;$0.1<A\leq0.5$ 3.6−1.2A, ;$0.5<A\leq1.0$ wherein $A=N_{RB\_alloc}/N_{RB\_agg}$. $N_{RB\_agg}$ indicates a number of RBs in a channel band, $N_{RB\_alloc}$ denotes a total number of RBs transmitted simultaneously, and CEIL $\{M_A, 0.5\}$ denotes a function that rounds $M_A$ on a 0.5 dB basis.

In one embodiment of the method, the second MPR value is determined based on CEIL $\{M_A, 0.5\}$, wherein, $M_A=10.0$, ; $0<A\leq0.16$ 12.3−23.3A, ;$0.16<A\leq0.4$ 3.67−1.67A, ; $0.4<A\leq1.0$ wherein $A=N_{RB\_alloc}/N_{RB\_agg}$. $N_{RB\_agg}$ indicates a number of RBs in a channel band, $N_{RB\_alloc}$ denotes a total number of RBs transmitted simultaneously, and CEIL $\{M_A, 0.5\}$ denotes a function that rounds $M_A$ on a 0.5 dB basis.

In one embodiment of the method, determining the maximum power reduction (MPR) value comprises: upon determination that the uplink data transmission uses the 64 QAM and corresponds to the single-clustered transmission, determining a MPR value to be applied for transmitting the uplink data using the 16 QAM as an MPR value to be applied for transmitting the uplink data using the 64 QAM.

In one embodiment of the method, the first MPR and second MPR values has a power reduction level larger than a MPR value to be applied for transmission of the uplink data using the 16 QAM.

In one embodiment of the method, when the plurality of carriers are aggregated via the carrier aggregation, a maximum bandwidth of the plurality of carriers is 40 MHz.

In second aspect, there is provided a wireless device for determining an uplink transmission power, the device comprising: a RF unit for transmitting and receiving a wireless signal; and a processor for controlling the RF unit, wherein the processor is configured: to determine whether uplink data transmission uses 64 QAM (Quadrature Amplitude Modulation); to determine whether the uplink data transmission corresponds to multi-clustered transmission; to determine whether the uplink data transmission should be performed on a single carrier or on a plurality of carriers using carrier aggregation (CA); and to determine a maximum power reduction (MPR) value to be applied to the uplink data transmission based the determination results; wherein upon determination that the uplink data transmission uses the 64 QAM, and corresponds to the multi-clustered transmission and is performed on the single carrier, a first MPR value is determined as the maximum power reduction (MPR) value to be applied to the uplink data transmission; wherein upon determination that the uplink data transmission uses the 64 QAM and corresponds to the multi-clustered transmission and is performed on the plurality of carriers, a second MPR value is determined as the maximum power reduction (MPR) value to be applied to the uplink data transmission.

According to the disclosure of the present specification, the problems of the above-described prior art are solved.

BRIEF DESCRIPTION OF THE DRAWINGS

FIG. 11 is a concept view illustrating intra-band CA (carrier aggregation).

FIG. 21 is a flowchart showing a transmission power determination method for 64 QAM according to the present disclosure.

DETAILED DESCRIPTIONS

Figure 1:
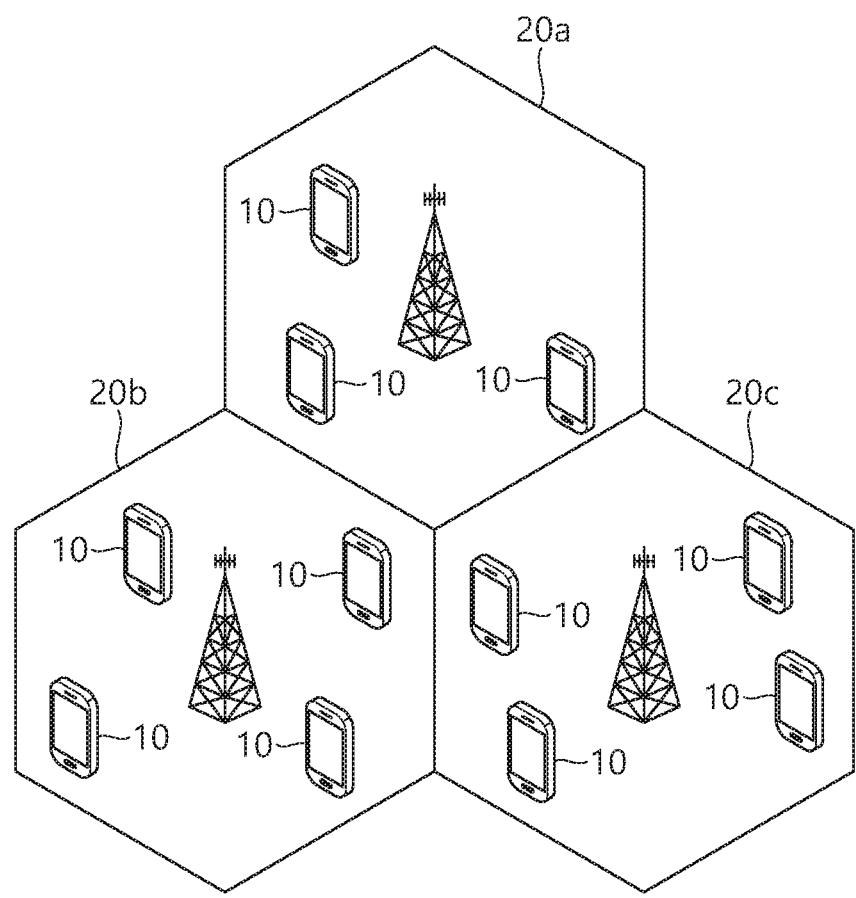
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Meanwhile, the LTE system defined in the 3GPP adopts such MIMO. Hereinafter, LTE systems are described in greater detail.

Figure 2:
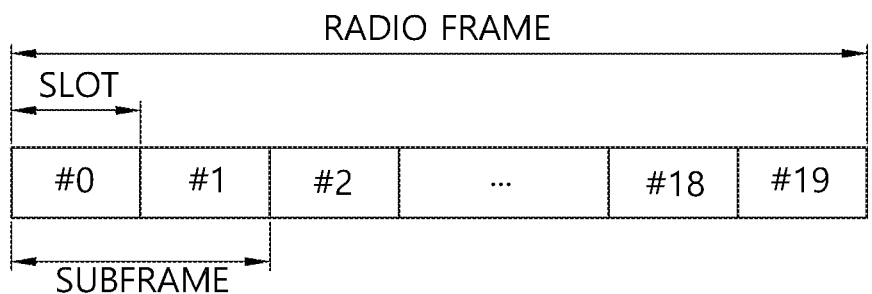
FIG. 2 illustrates the architecture of a radio frame according to FDD (frequency division duplex) in 3GPP LTE.

FIG. 2 illustrates the architecture of a radio frame according to FDD (frequency division duplex) in 3GPP LTE.

For the radio frame shown in FIG. 2, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, a radio frame includes 10 sub-frames, and one sub-frame includes two slots. The slots in the radio frame are marked with slot numbers 0 through 19. The time taken for one sub-frame to be transmitted is referred to as a TTI (transmission time interval). The TTI may be the unit of scheduling for data transmission. For example, the length of one radio frame may be 10 ms, the length of one sub-frame may be 1 ms, and the length of one slot may be 0.5 ms.

The architecture of a radio frame is merely an example, and the number of sub-frames included in the radio frame or the number of slots included in a sub-frame may vary differently.

Meanwhile, one slot may include a plurality of OFDM symbols. How many OFDM symbols are included in one slot may vary depending on cyclic prefix (CP).

Figure 3:
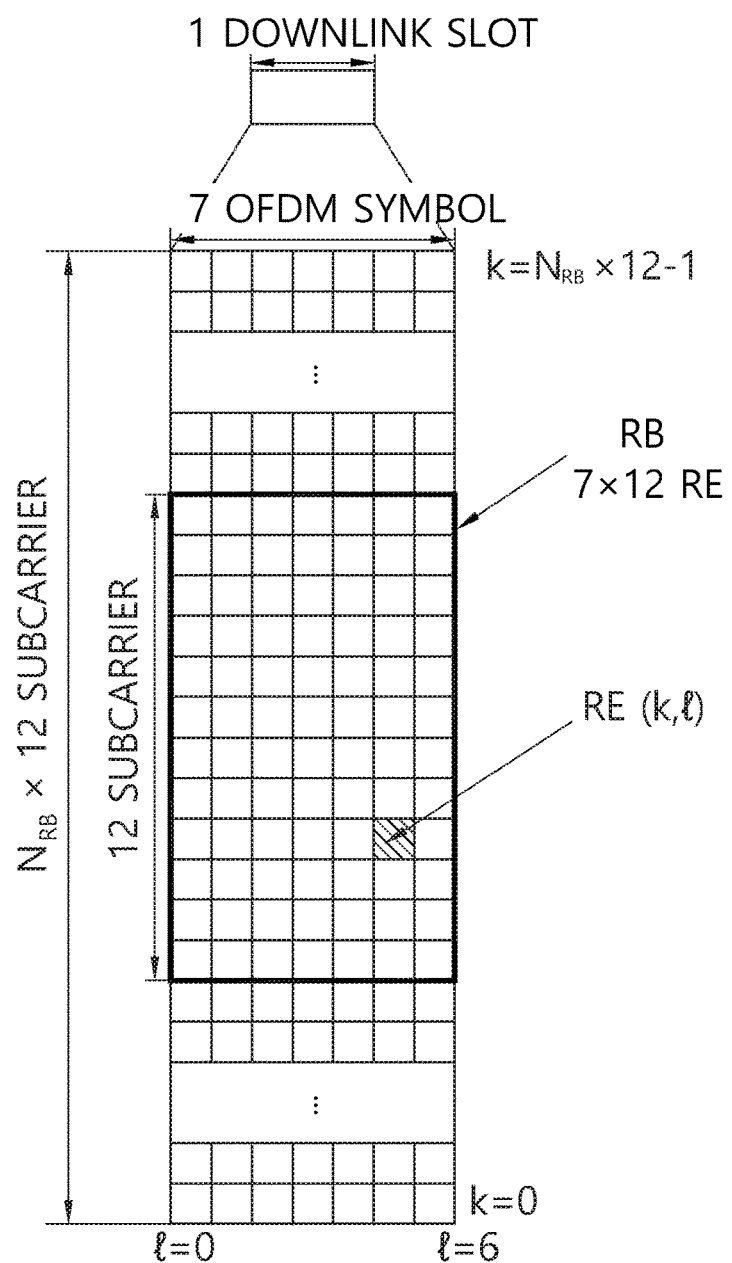
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

Figure 4:
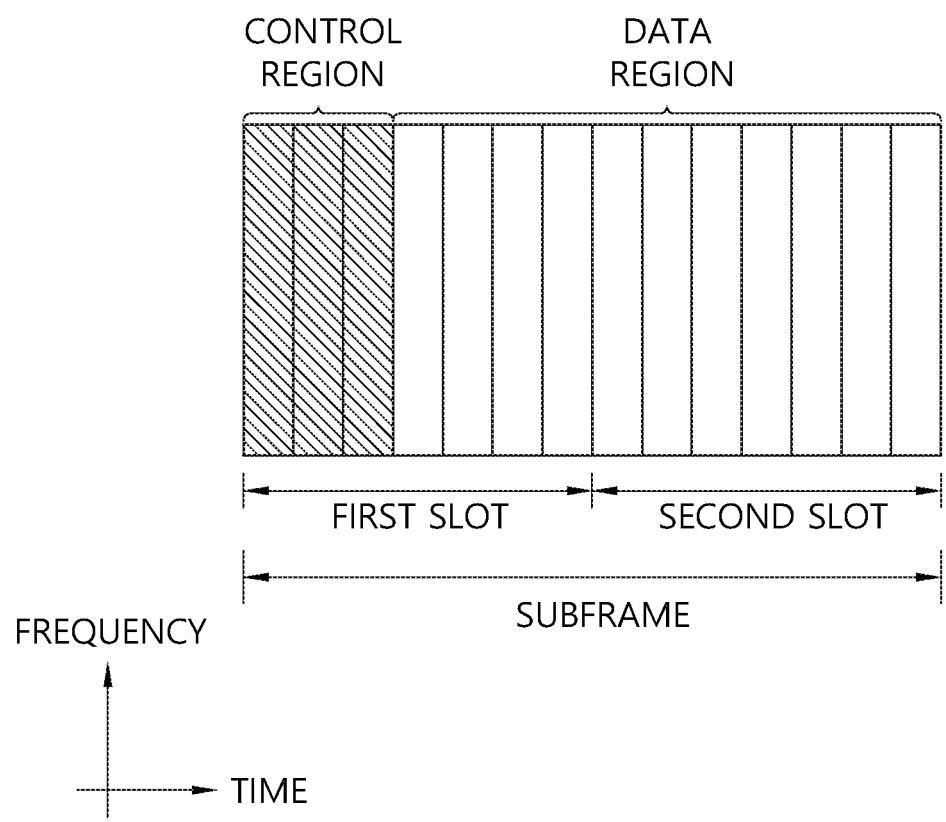
FIG. 4 illustrates the architecture of a downlink sub-frame in 3GPP LTE.

In 3GPP LTE, the resource grid for one uplink slot shown in FIG. 4 may also apply to the resource grid for the downlink slot.

FIG. 4 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Figure 5:
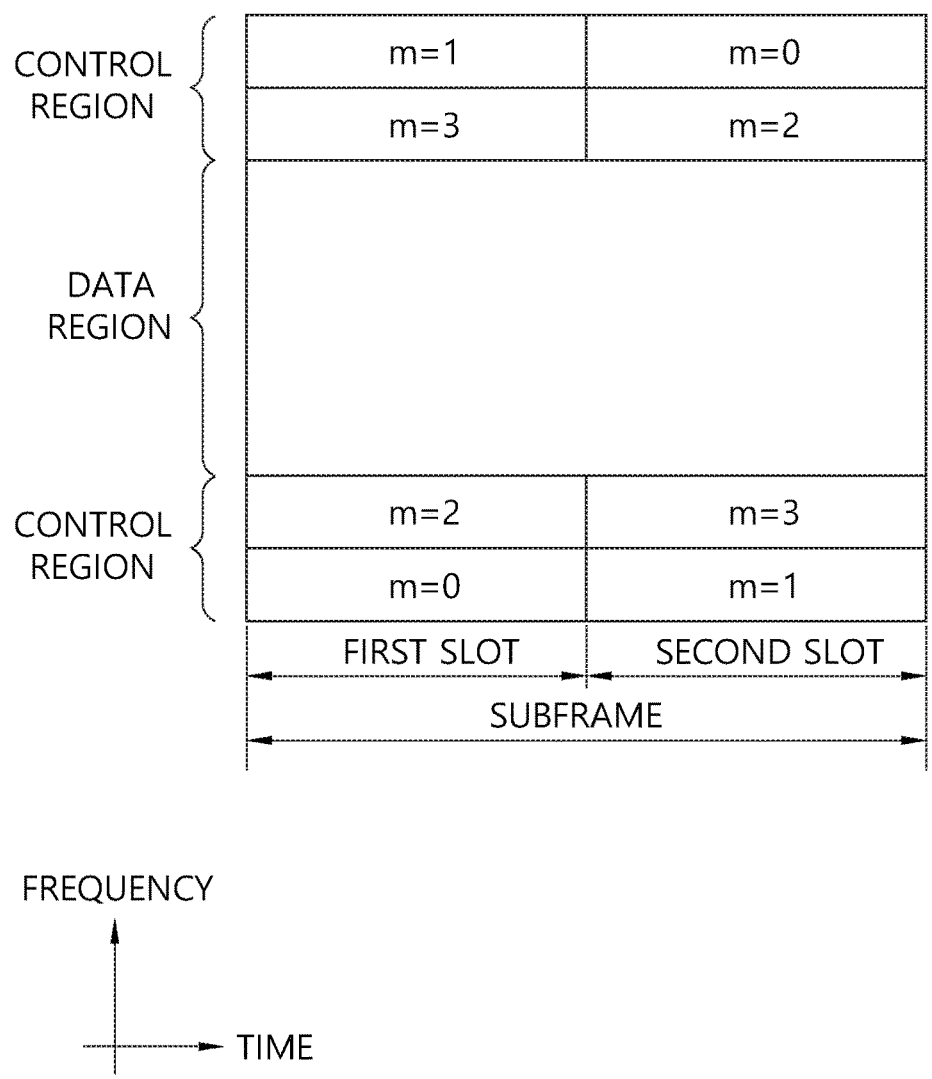
FIG. 5 illustrates the architecture of an uplink sub-frame in 3GPP LTE.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Meanwhile, an SC-FDMA transmission scheme is now described.

LTE (Long-Term Evolution) adopts, for uplink, SC (Single-Carrier) FDMA that is similar to OFDM (Orthogonal Frequency Division Multiplexing).

SC-FDMA may also be referred to as DFT-s OFDM (DFT-spread OFDM). In case the SC-FDMA transmission scheme is used, a non-linear distortion section of a power amplifier may be avoided, so that transmission power efficiency may be increased in a terminal with limited power consumption. Accordingly, user throughput may be increased.

SC-FDMA is similar to OFDM in that a signal is carried over split sub-carriers using FFT (Fast Fourier Transform) and IFFT (Inverse-FFT). However, an issue with the existing OFDM transmitter lies in that signals conveyed on respective sub-carriers on frequency axis are transformed into time-axis signals by IFFT. That is, in IFFT, the same operation is operated in parallel, resulting in an increase in PAPR (Peak to Average Power Ratio). In order to prevent such PAPR increase, SC-FDMA performs IFFT after DFT spreading unlike OFDM. That is, such transmission scheme that, after DFT spreading, IFFT is conducted is referred to as SC-FDMA. Accordingly, SC-FDMA is also referred to as DFT spread OFDM (DFT-s-OFDM) in the same meaning.

As such, advantages of SC-FDMA include providing robustness over a multi-path channel that comes from the fact that it has a similar architecture to OFDM while fundamentally resolving the problem of OFDM that PAPR is increased by IFFT operation, thereby enabling effective use of a power amplifier.

Figure 6:
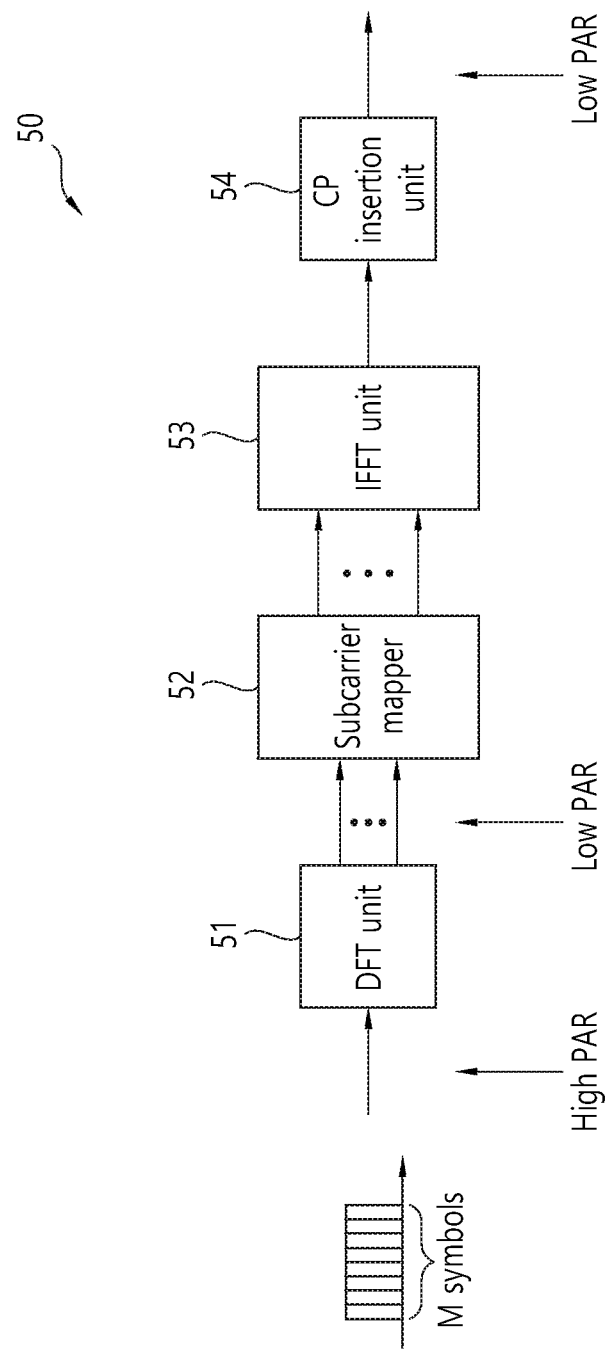
FIG. 6 is a block diagram illustrating an SC-FDMA (single carrier-frequency division multiple access) transmission scheme that is an uplink access scheme adopted in 3GPP LTE.

FIG. 6 is a block diagram illustrating an SC-FDMA transmission scheme that is an uplink access scheme adopted in 3GPP LTE.

Referring to FIG. 6, a transmitter 50 may include a DFT (Discrete Fourier Transform) unit 51, a sub-carrier mapper 52, an IFFT unit 53, and a CP inserting unit 54. The transmitter 50 may include a scramble unit (not shown), a modulation mapper (not shown), a layer mapper (not shown), and a layer permutator (not shown), which may be positioned ahead of the DFT unit 51.

To prevent the above-described increase in PAPR, the SC-FDMA transmitter subjects information to the DFT unit 51 prior to mapping a signal to a sub-carrier. The signal spread (, or in the same concept, precoded) by the DFT unit 51 is sub-carrier mapped through the sub-carrier mapper 52, which then goes through the IFFT (Inverse Fast Fourier Transform) unit 53, thus producing a signal over time axis.

That is, thanks to the correlation between the DFT unit 51, the sub-carrier mapper 52, and the IFFT unit 53, SC-FDMA does not significantly increase the PAPR (peak-to-average power ratio) of a time-domain signal after undergoing the IFFT unit 53, unlike OFDM, and is thus advantageous in light of transmission power efficiency. In other words, SC-FDMA may experience a decrease in PAPR or CM (cubic metric).

The DFT unit 51 performs DFT on input symbols to output complex valued symbols. For example, if $N_{tx}$ symbols are input (where, $N_{tx}$ is a natural number), the DFT size is $N_{tx}$. The DFT unit 51 may also be called a transform precoder. The sub-carrier mapper 52 maps the complex valued symbols to respective sub-carriers in the frequency domain. The complex valued symbols may be mapped to resource elements corresponding to the resource block assigned for data transmission. The sub-carrier mapper 52 may be called a resource element mapper. The IFFT unit 53 performs IFFT on the input symbols to output a baseband signal for data that is a time-domain signal. The CP inserting unit 54 copies a tail portion of the baseband signal for data and inserts the copied portion to a head portion of the baseband signal for data. ISI (Inter-Symbol Interference) and ICI (Inter-Carrier Interference) may be prevented through CP insertion, thus allowing orthogonality to be maintained also in the multi-path channel.

Meanwhile, 3GPP is actively standardizing LTE-Advanced that is an advanced version of LTE and has adopted clustered DFT-s-OFDM scheme that permits non-contiguous resource allocation.

The clustered DFT-s-OFDM transmission scheme is a variation to the existing SC-FDMA transmission scheme and divides the data symbols that were subjected to a precoder into a plurality of sub-blocks and performs mapping with the sub-blocks separated from each other in the frequency domain.

Some major features of the clustered DFT-s-OFDM scheme include enabling frequency-selective resource allocation so that the scheme may flexibly deal with a frequency selective fading environment.

In this case, the clustered DFT-s-OFDM scheme, unlike the conventional LTE uplink access scheme, i.e., SC-FDMA, permits non-contiguous resource allocation, so that uplink data transmitted may be split into several units of cluster.

In other words, while the LTE system is rendered to maintain single carrier characteristics in the case of uplink, the LTE-A system allows for non-contiguous allocation of DFT_precoded data on frequency axis or simultaneous transmission of PUSCH and PUCCH. In such case, the single carrier features are difficult to maintain.

Figure 7:
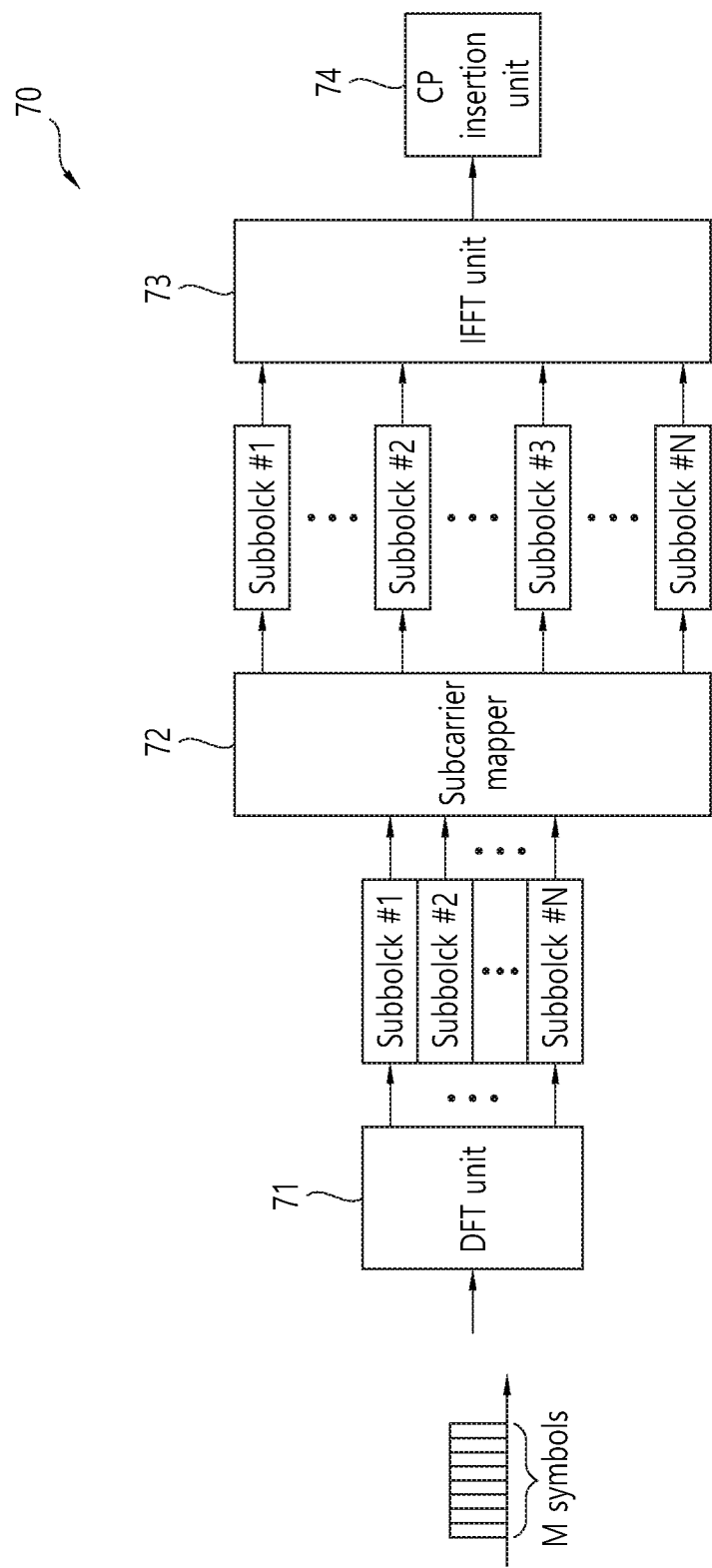
FIG. 7 illustrates an example of a transmitter to which the clustered DFT-spread-OFDM (DFT-s-OFDM) transmission scheme applies.

FIG. 7 illustrates an example of a transmitter to which the clustered DFT-s-OFDM transmission scheme applies.

Referring to FIG. 7, a transmitter 70 includes a DFT unit 71, a sub-carrier mapper 72, an IFFT unit 73, and a CP inserting unit 74. The transmitter 70 may include a scramble unit (not shown), a modulation mapper (not shown), a layer mapper (not shown), and a layer permutator (not shown), which may be positioned ahead of the DFT unit 71.

Complex valued symbols output from the DFT unit 71 are divided into N sub-blocks (N is a natural number). The N sub-blocks may be represented sub-block #1, sub-block #2, . . . , sub-block #N. The sub-carrier mapper 72 scatters the N sub-blocks in the frequency domain and maps the same to sub-carriers. Each NULL may be inserted between two contiguous sub-blocks. The complex valued symbols in one sub-block may be mapped to contiguous sub-carriers in the frequency domain. That is, a concentrated mapping scheme may be used in one sub-block.

Figure 8:
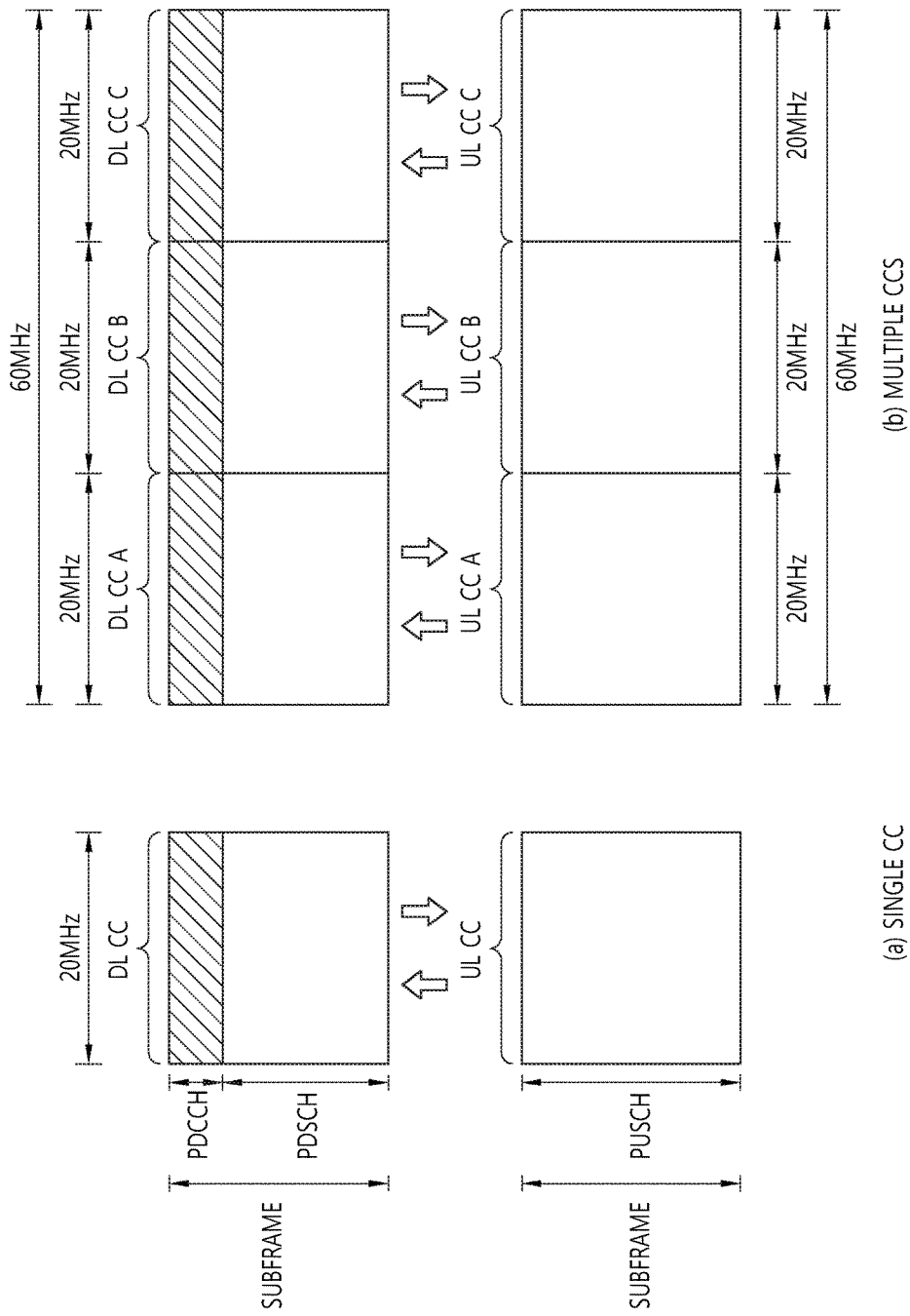
FIG. 8 illustrates an example of comparison between a single carrier system and a carrier aggregation system.

The transmitter 70 shown in FIG. 8 may be utilized for both a single carrier transmitter and a multi-carrier transmitter. In case the transmitter 70 is used for a single carrier transmitter, N sub-blocks all correspond to one carrier. In case the transmitter 70 is used for a multi-carrier transmitter, each of the N sub-blocks may correspond to one carrier. Or, even when the transmitter 70 is used for a multi-carrier transmitter, a plurality of the N sub-blocks may correspond to one carrier. Meanwhile, in the transmitter 70 shown in FIG. 8, a time-domain signal is generated through one IFFT unit 73. Accordingly, in order for the transmitter 70 of FIG. 8 to be used for a multi-carrier transmitter, the sub-carrier interval between adjacent carriers should be aligned under the contiguous carrier allocation circumstance.

A carrier aggregation system is now described.

FIG. 8 illustrates an example of comparison between a single carrier system and a carrier aggregation system.

Referring to FIG. 8, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell 2 is configured by connection of DL CC2 and UL CC2, activation of serving cell 2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 9:
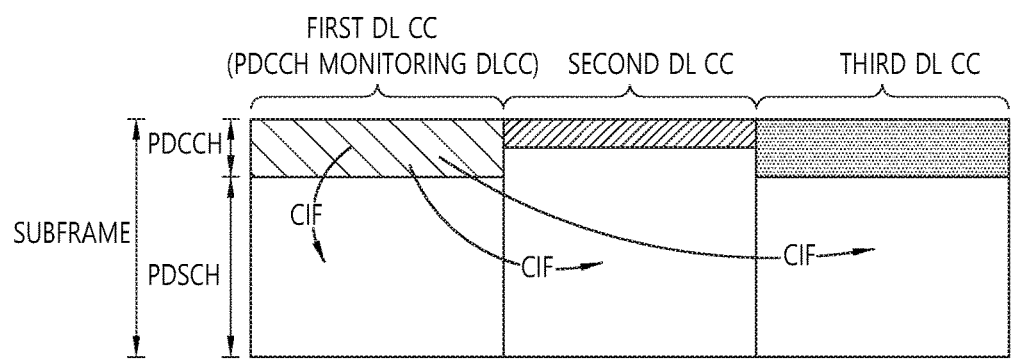
FIG. 9 illustrates an example of cross-carrier scheduling in a carrier aggregation system.

FIG. 9 illustrates an example of cross-carrier scheduling in a carrier aggregation system.

Referring to FIG. 9, the base station may configure a PDCCH monitoring DL CC (monitoring CC) set. The PDCCH monitoring DL CC set consists of some of all the aggregated DL CCs. If cross-carrier scheduling is configured, the terminal conducts PDCCH monitoring/decoding only on the DL CCs included in the PDCCH monitoring DL CC set. In other words, the base station transmits a PDCCH for PDSCH/PUSCH to be scheduled only through the DL CCs included in the PDCCH monitoring DL CC set. The PDCCH monitoring DL CC set may be configured terminal-specifically, terminal group-specifically, or cell-specifically.

Figure 10:
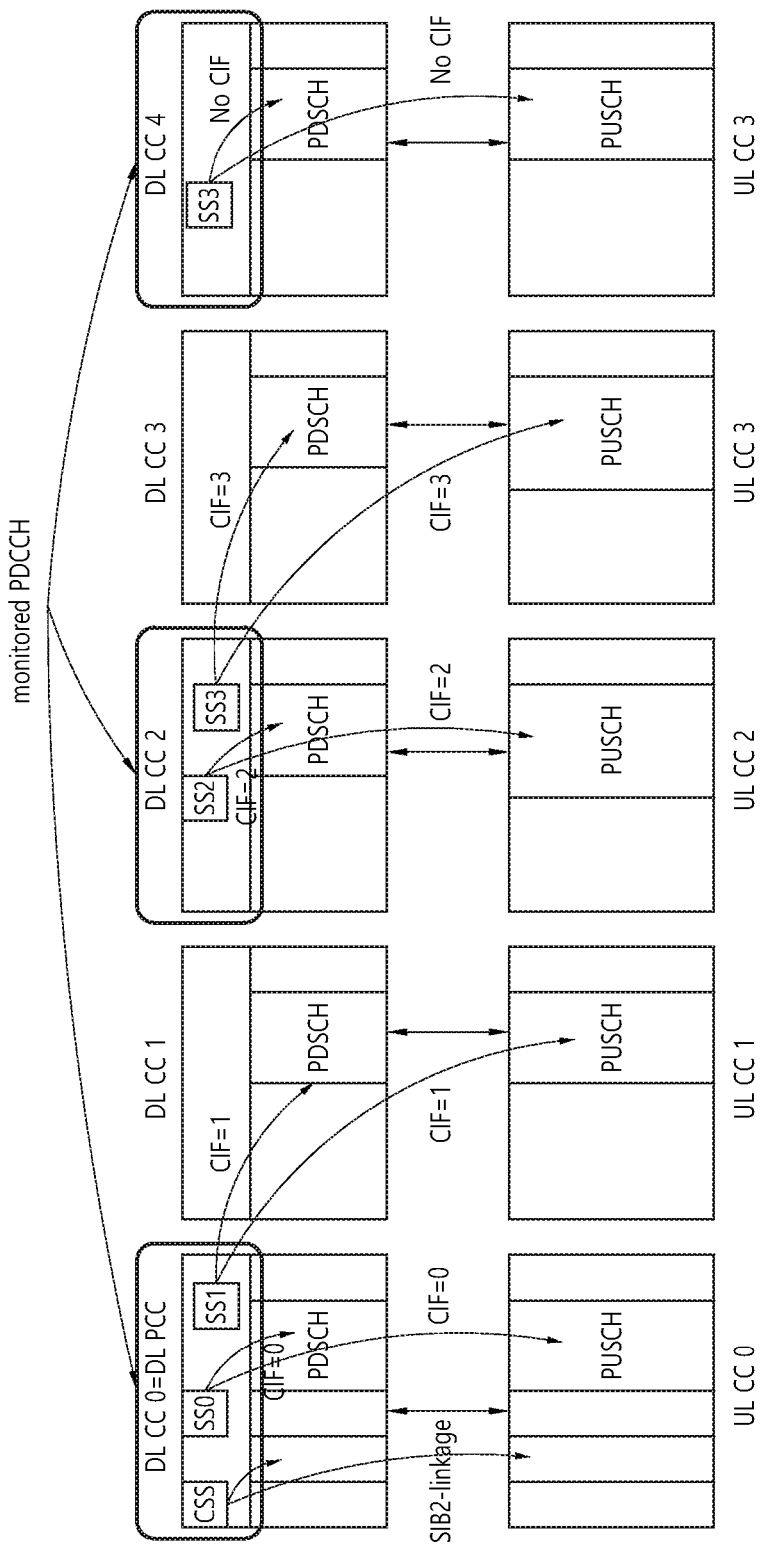
FIG. 10 illustrates an example scheduling when cross-carrier scheduling is configured in a carrier aggregation system.

In FIG. 10, three DL CCs (DL CC A, DL CC B, and DL CC C) are aggregated, and by way of example, DL CC A is set as the PDCCH monitoring DL CC set. The terminal may receive a DL grant for the PDSCH of DL CC A, DL CC B, and DL CC C through the PDCCH of DL CC A. The DCI transmitted through the PDCCH of DL CC A includes a CIF which allows it to be known which DL CC the DCI is for.

The CIF value is the same as the serving cell index value. The serving cell index is transmitted to the UE through an RRC signal. The serving cell index includes a value for identifying a serving cell, i.e., a first cell (primary cell) or a second cell (secondary cell). For example, 0 may represent a first cell (primary cell).

FIG. 10 illustrates example scheduling when cross-carrier scheduling is configured in a carrier aggregation system.

Referring to FIG. 10, DL CC 0, DL CC 2, and DL CC 4 are a PDCCH monitoring DL CC set. The terminal searches a DL grant/UL grant for DL CC 0, UL CC 0 (UL CC linked via SIB2 with DL CC 0) in the CSS of DL CC 0. In SS 1 of DL CC 0, a DL grant/UL grant for DL CC 1, UL CC 1 is searched. SS 1 is an example of the USS. That is, SS 1 of DL CC 0 is a search space for searching a DL grant/UL grant performing cross-carrier scheduling.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

FIG. 11 is a concept view illustrating intra-band carrier aggregation (CA).

FIG. 11a illustrates intra-band contiguous CA, and FIG. 11b illustrates intra-band non-contiguous CA.

LTE-advanced adds various schemes including uplink MIMO and carrier aggregation in order to realize high-speed wireless transmission. The CA may be split into the intra-band contiguous CA shown in FIG. 11a and the intra-band non-contiguous CA shown in FIG. 11b.

Figure 12:
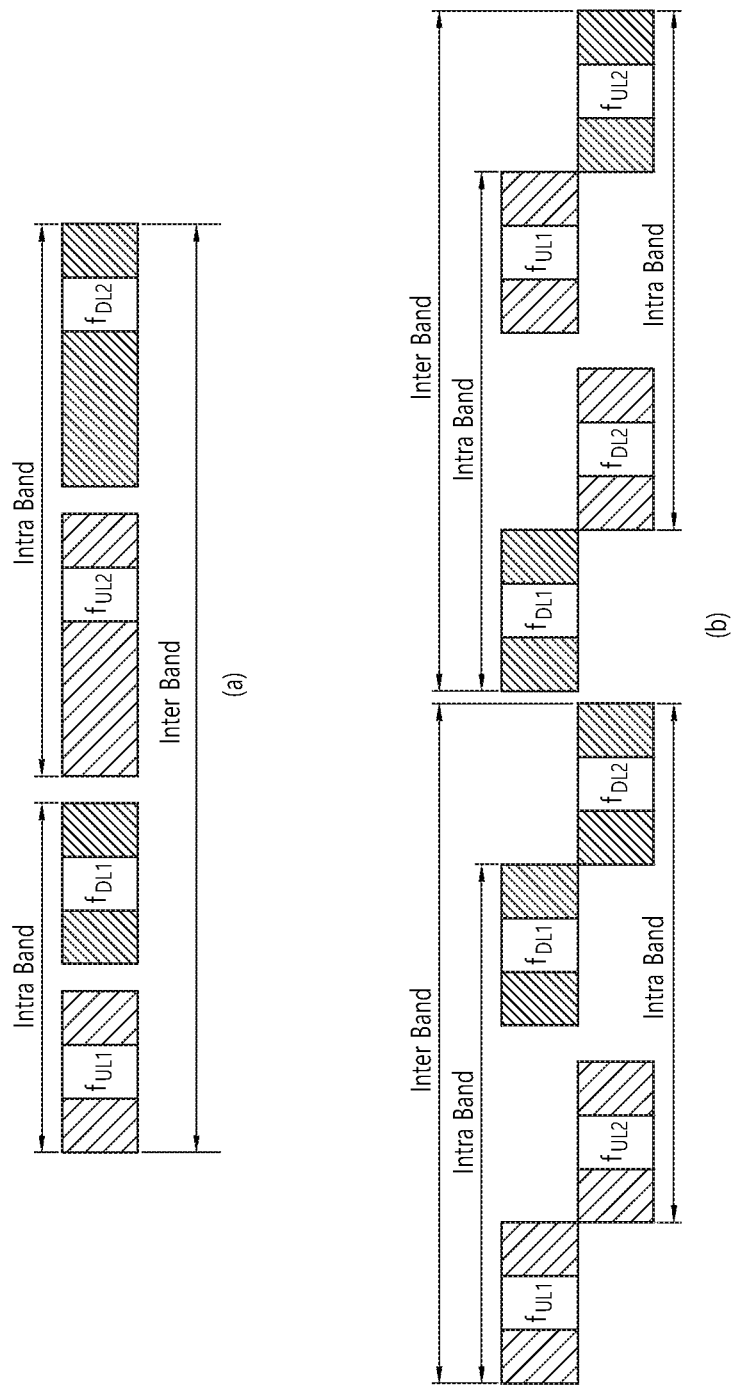
FIG. 12 is a concept view illustrating inter-band carrier aggregation.

FIG. 12 is a concept view illustrating inter-band carrier aggregation.

FIG. 12a illustrates a combination of a lower band and a higher band for inter-band CA, and FIG. 12b illustrates a combination of similar frequency bands for inter-band CA.

In other words, the inter-band carrier aggregation may be separated into inter-band CA between carriers of a low band and a high band having different RF characteristics of inter-band CA as shown in FIG. 12a and inter-band CA of similar frequencies that may use a common RF terminal per component carrier due to similar RF (radio frequency) characteristics as shown in FIG. 12b.

TABLE 1

| Operating Band | Uplink (UL) operating band $F_{UL\_low}$-$F_{UL\_High}$ | Downlink (DL) operating band $F_{DL\_low}$-$F_{DL\_High}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| ... | | | |

TABLE 1-continued

| Operating Band | Uplink (UL) operating band $F_{UL\_low}$-$F_{UL\_High}$ | Downlink (DL) operating band $F_{DL\_low}$-$F_{DL\_High}$ | Duplex Mode |
|---|---|---|---|
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 11 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, CA bandwidth classes and their corresponding guard bands are as shown in the following table.

TABLE 2

| CA Bandwidth Class | Aggregated Transmission Bandwidth Configuration | Maximum number of CCs | Nominal Guard Band BWGB |
|---|---|---|---|
| A | $N_{RB,\ agg} \leq 100$ | 1 | 0.05 $BW_{Channel(1)}$ |
| B | $N_{RB,\ agg} \leq 100$ | 2 | FFS |
| C | $100 < N_{RB,\ agg} \leq 200$ | 2 | 0.05 max($BW_{Channel(1)}$, $BW_{Channel(2)}$) |
| D | $200 < N_{RB,\ agg} \leq [300]$ | FFS | FFS |
| E | $[300] < N_{RB,\ agg} \leq [400]$ | FFS | FFS |
| F | $[400] < N_{RB,\ agg} \leq [500]$ | FFS | FFS |

In the above table, the brackets [ ] represent that the value therebetween is not completely determined and may be varied. FFS stands for 'For Further Study.' $N_{RB\_agg}$ is the number of RBs aggregated in an aggregation channel band.

Table 3 below shows a set of bandwidths, each corresponding to each CA configuration.

TABLE 3

| E-UTRA CA configuration | 50RB + 100RB (10 MHz + 20 MHz) | 75RB + 75RB (15 MHz + 15 MHz) | 75RB + 100RB (15 MHz + 20 MHz) | 100RB + 100 RB (20 MHz + 20 MHz) | Maximum aggregated bandwidth [MHz] | Bandwidth Combination Set |
|---|---|---|---|---|---|---|
| CA_1C | | Yes | | Yes | 40 | 0 |
| CA_7C | | Yes | | Yes | 40 | 0 |
| CA_38C | | Yes | | Yes | 40 | 0 |
| CA_40C | Yes | Yes | | Yes | 40 | 0 |
| CA_41C | Yes | Yes | Yes | Yes | 40 | 0 |

In the table above, the CA configuration represents an operation band and a CA bandwidth class. For example, CA_1C means an operation band2 of the table 1 and a CA band class C of the table 2. All CA operation classes may be applied to bands not shown in the table above.

Figure 13:
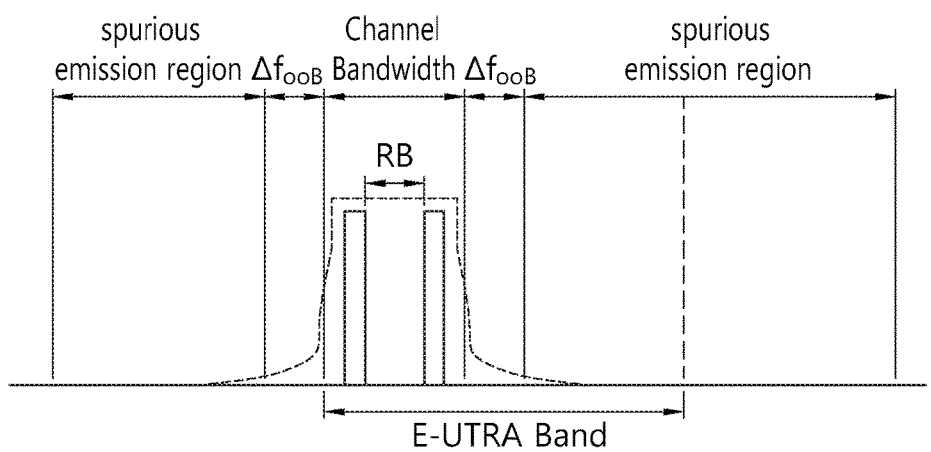
FIG. 13 illustrates the concept of unwanted emission, FIG. 14 specifically illustrates out-of-band emission of the unwanted emission illustrated in FIG. 13.
Figure 14:
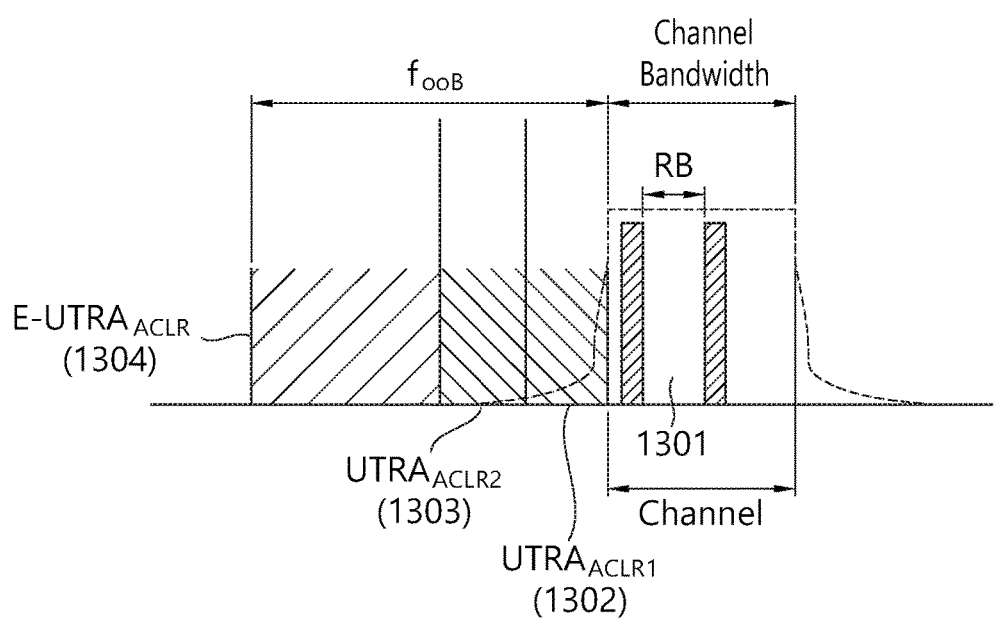
Figure 15:
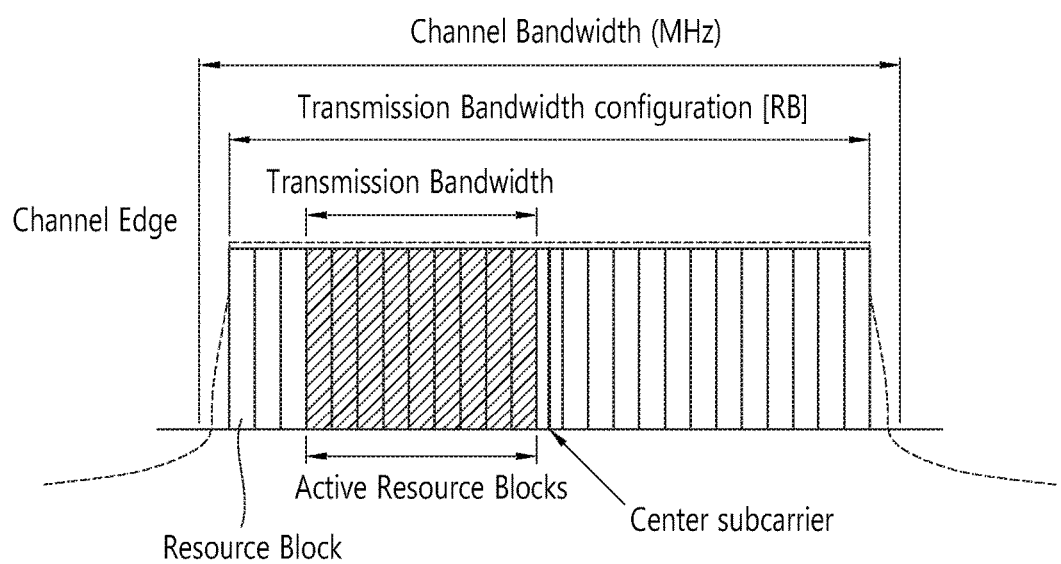
FIG. 15 illustrates a relationship between an RB (resource block) and channel band (MHz) illustrated in FIG. 13.

FIG. 13 illustrates the concept of unwanted emission. FIG. 14 specifically illustrates out-of-band emission of the unwanted emission shown in FIG. 13. FIG. 15 illustrates a relationship between the resource block RB and channel band (MHz) shown in FIG. 13.

As can be seen from FIG. 13, a transmission modem sends a signal over a channel bandwidth assigned in an E-UTRA band.

Figure 16:
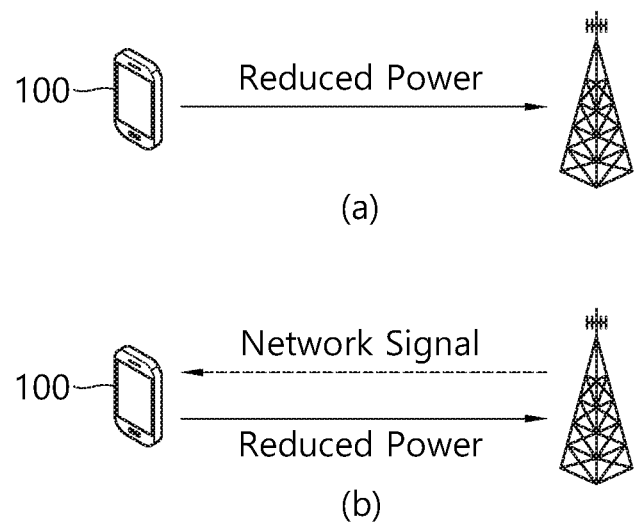
FIG. 16 illustrates an example of a method of limiting transmission power of a terminal.

Here, the channel bandwidth is defined as can be seen from FIG. 16. That is, a transmission bandwidth is set to be smaller than the channel bandwidth ($BW_{Channel}$). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 4

| Channel bandwidth $BW_{Channel}$ [MHz] | 1.4 | 3 | 5 | 10 | 15 | 20 |
|---|---|---|---|---|---|---|
| Transmission bandwidth settings $N_{RB}$ | 6 | 15 | 25 | 50 | 75 | 100 |

Turning back to FIG. 13, unwanted emission arises in the band of $\Delta f_{OOB}$, and as shown, unwanted emission also occurs on the spurious area. Here, $\Delta f_{OOB}$ means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

In the meantime, as illustrated in FIG. 14, if transmission is conducted in the E-UTRA channel band 1301, leakage, i.e., unwanted emission, occurs to out-of-bands (1302, 1303, and 1304 in the shown $f_{OOB}$ area).

Here, $UTRA_{ACLR1}$ denotes a ratio of leakage to a channel 1302 to an E-UTRA channel 1301, i.e., an adjacent channel leakage ratio, in case the adjacent channel 1302 is the one for UTRA when a terminal conducts transmission on the E-UTRA channel 1301. $UTRA_{ACLR2}$ is a ratio of leakage to a channel 1303 (a UTRA channel) located to the adjacent channel 1302, i.e., an adjacent channel leakage ratio, in case the channel 1303 is the one for UTRA, as shown in FIG. 13. E-UTRA$_{ACLR}$ is a ratio of leakage to an adjacent channel 1304 (i.e., an E-UTRA channel) when the terminal conducts transmission through the E-UTRA channel 1301, i.e., an adjacent channel leakage ratio.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device.

Accordingly, the terminal's transmission power needs to be limited.

FIG. 16 illustrates an example of a method of limiting transmission power of a terminal.

Figure 17A:
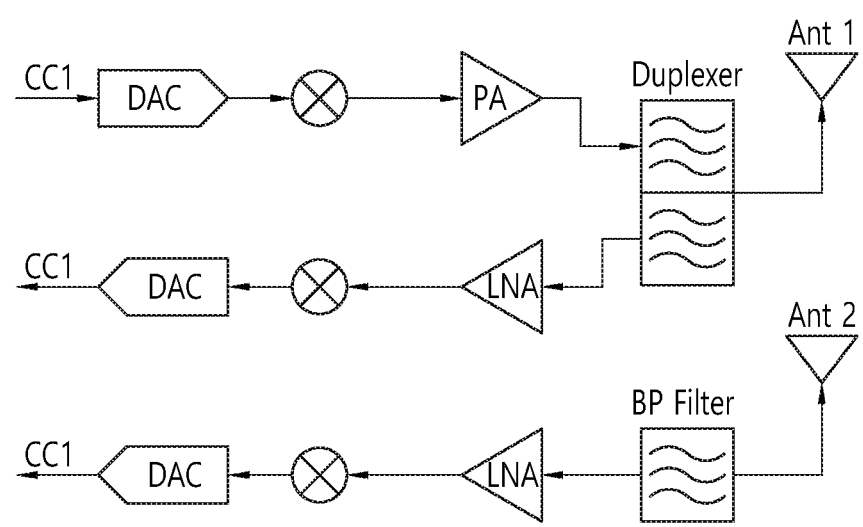
FIG. 17A shows a architecture of an RF unit of a wireless device having a diversity antenna for simulation according to embodiments of the present disclosure.

As can be seen from FIG. 17a, the terminal 100 conducts transmission power limited In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity. This is shown in the following table.

TABLE 5

| | Channel bandwidth/Transmission bandwidth (NRB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

Table 5 above represents MPR values for power classes 1 and 3.

<MPR per 3GPP release 11>

Meanwhile, according to 3GPP release 11, the terminal adopts multi-cluster transmission in a single CC (component carrier) and may simultaneously transmit a PUSCH and a PUCCH. As such, if the PUSCH and the PUCCH are transmitted at the same time, the size of the IM3 component (which means a distortion signal generated by intermodulation) that occurs at an out-of-band area may be increased as compared with the existing size, and this may serve as larger interference to an adjacent band. Thus, the following MPR value may be set so as to meet general spurious emission, ACLR (adjacent channel leakage ratio) and general SEM (spectrum emission mask) that are the terminal's emission requirements that should be observed by the terminal upon uplink transmission.

$$MPR=CEIL\{M_A, 0.5\} \quad \text{Equation 1}$$

Here, $M_A$ is as follows.

$M_A$=[8.0]−[10.12]A ; 0<A≤[0.33]

[5.67]−[3.07]A ; [0.33]<A≤[0.77]

[3.31] ; [0.77]<A≤[1.0]

Here, A is as follows.

$$A=N_{RB\_alloc}/N_{RB\_agg}.$$

$N_{RB\_agg}$ is the number of RBs in the channel band, and $N_{RB\_alloc}$ is the total number of RBs that are transmitted at the same time.

CEIL$\{M_A, 0.5\}$ is a function that rounds off on a per−0.5 dB basis. That is, MPR∈[3.0 3.5 4.0 4.5 5.0 5.5 6.0 6.5 7.0 7.5 8.0].

The MPR value shown in Equation above is the one that applies when a general PA (power amplifier) is used. If a high efficiency power amplifier (HEPA) that is recently being researched is used, an MPR value of a higher level may be needed. However, despite its advantage that it may reduce power consumption and heat radiation by 30% or more, the HEPA suffers from reduced cell coverage that comes from demand of a larger MPR value. Further, since linearity is guaranteed only up to 20 MHz to date, linearity is not insured considering carrier aggregation (CA).

<General MPR>

Taking the CA into account, the channel bandwidth of uplink, meanwhile, may be increased up to 40 MHz (20 MH+20 MHz), and accordingly, a larger MPR value is needed.

TABLE 6

| | CA bandwidth Class C | | | | MPR |
|---|---|---|---|---|---|
| Modulation | 50 RB + 100 RB | 75 RB + 75 RB | 75 RB + 100 RB | 100 RB + 100 RB | (dB) |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤18 | ≤1 |
| 16 QAM | >12 and ≤50 | >16 and ≤75 | >16 and ≤75 | >18 and ≤100 | ≤2 |
| 16 QAM | >50 | >75 | >75 | >100 | ≤3 |

Table 6 above represents MPR values for power class 3.

As in Table 6, in the case of class C of intra contiguous CA, an MPR value up to 3 dB may apply depending on modulation schemes. Meanwhile, under the environment of CA class C, the MPR value as follows should be met considering multi-cluster transmission.

$$MPR=CEIL\{M_A, 0.5\} \quad \text{Equation 2}$$

Here, $M_A$ is as follows.

MA=8.2 ; 0≤A<0.025

9.2−40A ; 0.025≤A<0.05

8−16A ; 0.05≤A<0.25

4.83−3.33A ; 0.25≤A≤0.4, 3.83−0.83A ; 0.4≤A≤1,

<A-MPR Based on LTE>

Figure 17B:
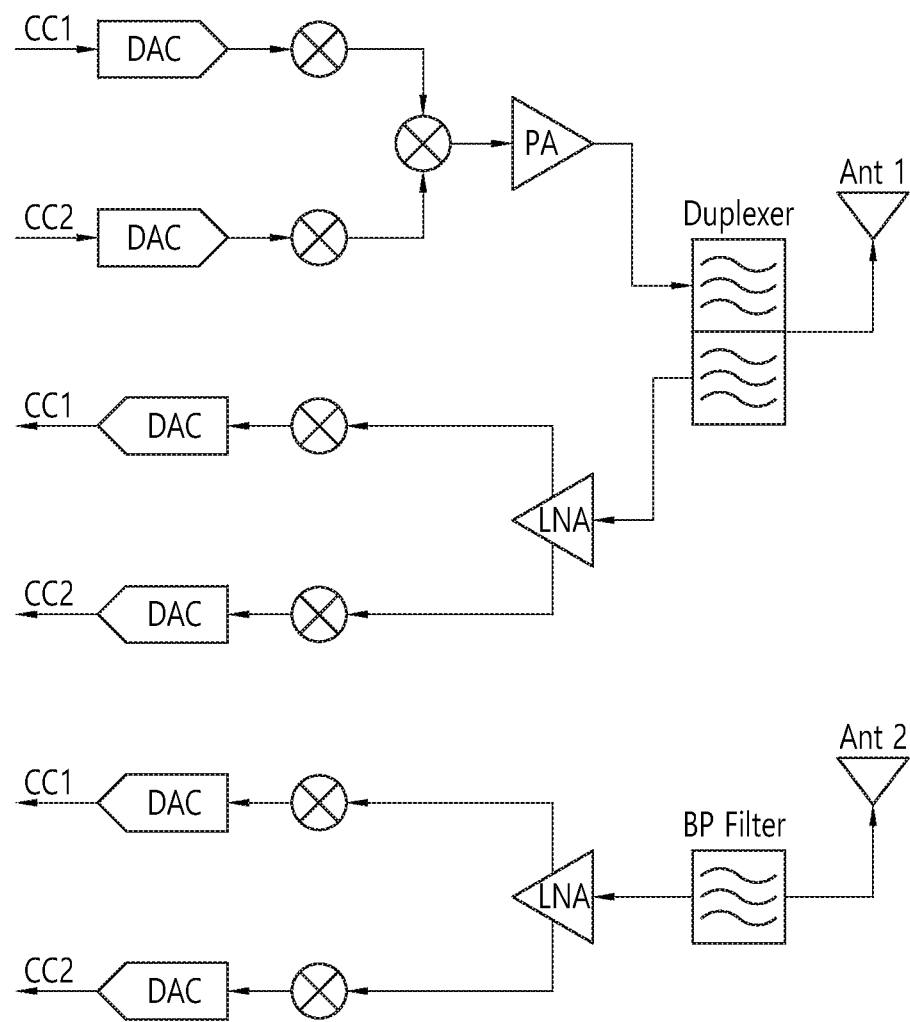
FIG. 17B shows a architecture of an RF unit of a wireless device for intra-band contiguous carrier aggregation (CA).

As can be seen from FIG. 17(b), a BS may apply A-MPR (additional maximum power reduction) by transmitting an NS (network signal) to a terminal 100. Unlike the aforementioned MPR, in order not to have an effect on adjacent bands or the like, the A-MPR is an operation in which the BS transmits the NS to the terminal 100 operating in a specific operating band so that the terminal additionally performs power reduction. That is, when a terminal to which the MPR is applied receives the NS, transmission power is determined by additionally applying the A-MPR.

DISCLOSURE OF THE PRESENT INVENTION

Now, a transmission power determination method for 64 QAM (Quadrature Amplitude Modulation) according to embodiments of the present disclosure will be described based on experimental results.

More specifically, a first embodiment of the present disclosure relates to MPR masking to satisfy unwanted emission requirements when a wireless device supporting 64 QAM performs two or more multi-clustered transmission. A second embodiment of the present disclosure also relates to a minimum requirement of a wireless device to define the MPR value required to perform four multi-clustered transmission in a carrier aggregation (CA) environment.

FIG. 17A shows a architecture of an RF unit of a wireless device having a diversity antenna for simulation according to embodiments of the present disclosure. FIG. 17B shows a architecture of an RF unit of a wireless device for intra-band contiguous carrier aggregation (CA).

When simulating the MPR level generally required in the architecture of the wireless device as shown in FIG. 17A and FIG. 17B, an environment for the simulation is as follows:

Transmission architecture: a single PA (Power Amplifier), a single antenna model Maximum 2-clustered transmission per cluster Using general SEM/SE (general spectrum emission mask/ spurious emission) according to the requirements of TS36.101

Using general Adjacent Channel Leakage Ratio (ACLR) according to the requirements of TS36.101

Channel bandwidth:

5 MHz/10 MHz/15 MHz/20 MHz for a single CC

Aggregated channel bandwidths for contiguous carrier aggregation in intra-band=25 MHz/30 MHz/35 MHz/40 MHz Modulator impairments In-phase/Quadrature Imbalance: 25 dBc Carrier leakage: 25 dBc Counter IM3: 60 dBc PA operation point: when all RBs are allocated in 100 RB QPSK in Release 8, Pout=22 dBm PSD (Power Spectral Density) of subblock: the same When a wireless device having a architecture as shown in FIG. 17A and FIG. 17B transmits uplink data using a 64 QAM modulation scheme in a single-clustered transmission or a multi-clustered transmission, a required general MPQ mask is described using an RB allocation ratio A (the number of allocated RBs/the total number of RBs).

<Single Component Carrier Wireless Device>

1) Single-Clustered Transmission

The CM is an indicator of how often a PAPR issue actually occurs with reflecting the characteristics of the PA (Power Amplifier). This CM may be obtained by the following equation:

$$CM = \frac{20\log_{10}\{rms[v_{norm}^3(t)]\} - 20\log_{10}\{rms[vref_{norm}^3(t)]\}}{K} \text{ dB} \quad \text{[Equation 3]}$$

where $20 \log_{10} \{rms[v_{norm}^3(t)]\}$ refers to a raw cubic metric of a signal. The raw cubic metric of a W-CDMA voice reference signal is $20 \log_{10} \{rms[vref_{norm}^3(t)]\}=1.52$ dB $$rms(x) = \sqrt{\frac{(x'x)}{N}}, \quad v_{norm}(t) = \frac{|v(t)|}{rms[v(t)]}.$$

More specifically,

In Equation 3, K for a set of W-CDMA signals may be determined empirically as 1.85. Further, the present disclosure estimates the value of K for the multi-carrier signal as 1.56.

Table 7 below shows simulation results of the raw cubic metric of LTE signals.

TABLE 7

| Signal | Sys | Map | NFFT | CP Fract | NActive | Modn | BW(MHz) | Raw CM (dB) |
|---|---|---|---|---|---|---|---|---|
| A | OFDM | PUSC-UL | 512 | 0.25 | 408 | 16 QAM | 4.51 | 7.75 |
| B | DFTS-OFDM | UL | 512 | 0.0625 | 300 | QPSK | 4.51 | 3.44 |
| C | DFTS-OFDM | UL | 512 | 0.0625 | 300 | 16 QAM | 4.51 | 4.85 |
| D | DFTS-OFDM | UL | 512 | 0.0625 | 300 | 64 QAM | 4.51 | 5.18 |
| E | IFDMA | Full | 512 | 0.25 | 512 | QPSK | 3.84 | 2.40 |
| F | IFDMA | Full | 512 | 0.25 | 512 | 16 QAM | 3.84 | 4.36 |
| G | IFDMA | Full | 512 | 0.25 | 512 | 64 QAM | 3.84 | 4.64 |

In the table 7 above, the raw cubic metric of 16 QAM is 4.85 and the raw cubic metric of 64 QAM is 5.18. Substituting the raw cubic metric of 64 QAM into Equation 3, the CM of 64 QAM is (5.18−1.52)/1.56=2.34. Based on Equation 3, the CM according to each modulation scheme is obtained as in the following Table 8.

TABLE 8

| RB per cluster or DFT block | | QPSK | | | 16 QAM | | | 64 QAM | | |
|---|---|---|---|---|---|---|---|---|---|---|
| | | 2 | 4 | 8 | 2 | 4 | 8 | 2 | 4 | 8 |
| OFDMA | | | | | | 4.00 | | | | |
| SC-FDMA | | | 1.22 | | | 2.18 | | | 2.34 | |
| ClusteredDFT-s-OFDMA, number of clusters | 2 | 1.96 | 1.96 | 1.96 | 2.62 | 2.64 | 2.64 | 2.76 | 2.76 | 2.77 |
| | 3 | 2.51 | 2.51 | 2.52 | 2.99 | 3.00 | 3.01 | 3.09 | 3.10 | 3.09 |
| | 4 | 2.82 | 2.82 | 2.83 | 3.20 | 3.21 | 3.21 | 3.29 | 3.28 | 3.29 |
| | 5 | 3.04 | 3.02 | 3.04 | 3.35 | 3.34 | 3.35 | 3.40 | 3.40 | 3.42 |
| | 6 | 3.19 | 3.18 | 3.18 | 3.45 | 3.45 | 3.44 | 3.51 | 3.50 | 3.51 |
| | 7 | 3.28 | 3.29 | 3.29 | 3.52 | 3.52 | 3.52 | 3.56 | 3.57 | 3.57 |
| | 8 | 3.31 | 3.30 | 3.31 | 3.53 | 3.52 | 3.53 | 3.57 | 3.57 | 3.57 |
| Nx SC-FDMA, number of DFT blocks | 2 | 2.56 | 2.54 | 2.56 | 3.04 | 3.05 | 3.05 | 3.13 | 3.15 | 3.15 |
| | 3 | 3.04 | 3.04 | 3.05 | 3.37 | 3.38 | 3.37 | 3.43 | 3.42 | 3.43 |
| | 4 | 3.29 | 3.30 | 3.30 | 3.53 | 3.53 | 3.54 | 3.57 | 3.58 | 3.57 |
| | 5 | 3.42 | 3.44 | 3.44 | 3.63 | 3.62 | 3.62 | 3.67 | 3.66 | 3.67 |
| | 6 | 3.56 | 3.54 | 3.53 | 3.69 | 3.71 | 3.70 | 3.73 | 3.71 | 3.71 |
| | 7 | 3.60 | 3.61 | 3.61 | 3.74 | 3.74 | 3.74 | 3.77 | 3.77 | 3.77 |
| | 8 | 3.67 | 3.67 | 3.65 | 3.80 | 3.77 | 3.77 | 3.81 | 3.80 | 3.80 |

The following experimental result 1 may be derived based on simulation results according to the modulation schemes described in the table 8 above.

Experimental Results 1: CM Results Between 16 (MM and 64 QAM are Similar

Therefore, when performing a single-clustered transmission, the MPR value of 16 QAM may be applied, as it is, to 64 QAM, as shown in the following table 9.

TABLE 9

| | Channel bandwidth/Transmission bandwidth ($N^{RB}$) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |
| 64 QAM | ≤5 | ≤4 | ≤8 | ≤12 | ≤16 | ≤18 | ≤1 |
| 64 QAM | >5 | >4 | >8 | >12 | >16 | >18 | ≤2 |

2) Multi-Clustered Transmission

In the case of conventional multi-clustered transmission, MPR values are not determined based on CM and PAPR. Rather, MPR values are determined by backoffing the transmission power (Tx power) to satisfy requirements for ACLR, E-ACLR, general SEM and general SE resulting from actual multi-clustered transmission. This is because the MPR value required to limit the general Tx leakage level is a more dominant factor than the MPR value based on the existing CM value.

Figure 18A:
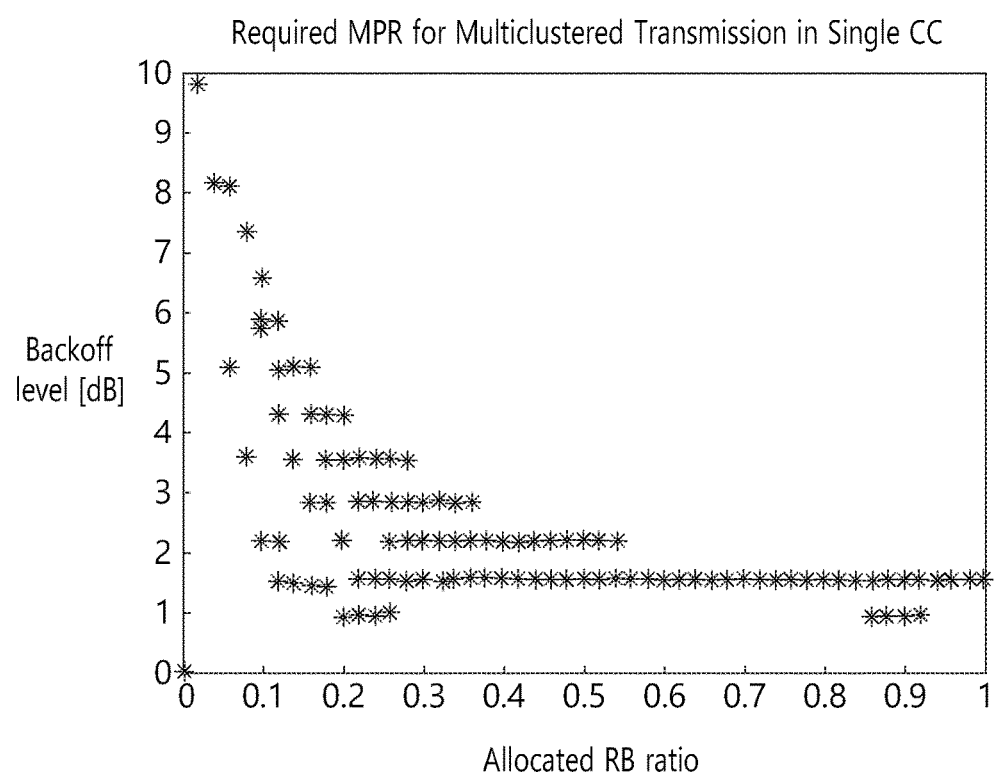
FIG. 18A shows a graph of MPR values required at 20 MHz according to a change of a start position and a RB length of a cluster.
Figure 18B:
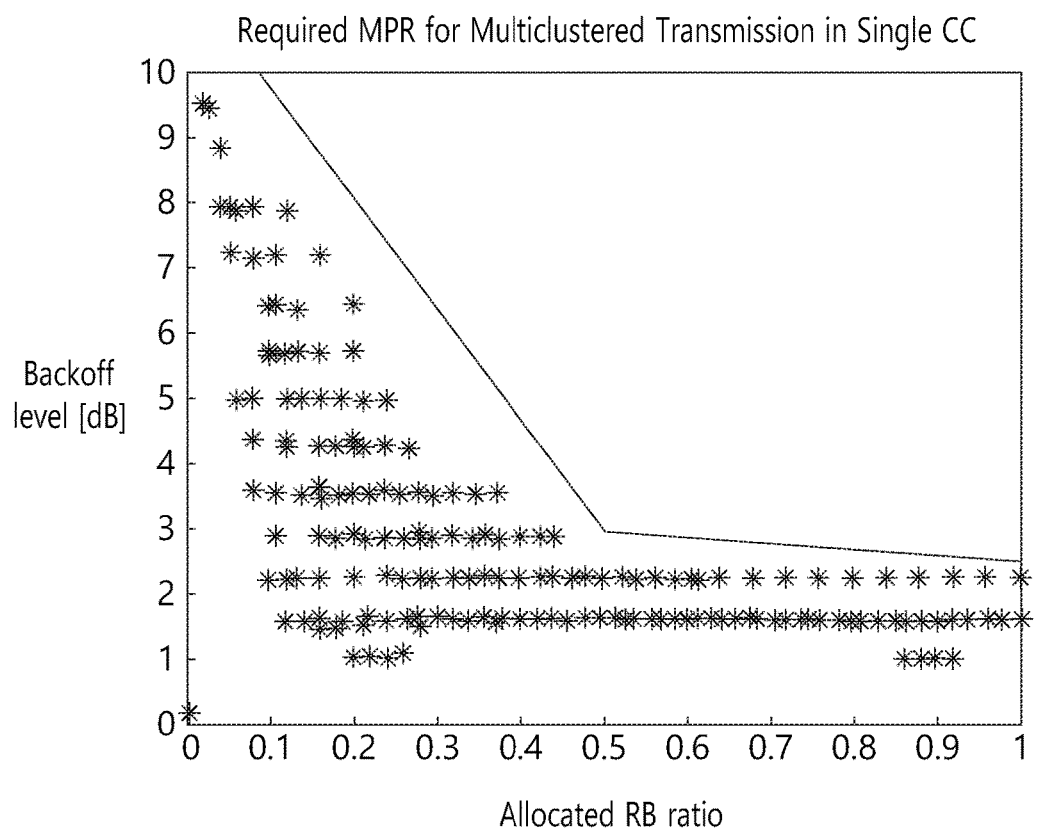
FIG. 18B is a graph showing MPR values required at 10 MHz according to a change of a start position and a RB length of a cluster.

FIG. 18A shows a graph of MPR values required at 20 MHz according to a change of a start position and a RB length of a cluster. FIG. 18B is a graph showing MPR values required at 10 MHz according to a change of a start position and a RB length of a cluster.

Based on the simulation results of the MPR values shown in FIGS. 18A and 18B, the following experimental result 2 may be derived.

Experimental Result 2: MPR Level Required for 64 QAM for Multi-Clustered Transmission is Higher than that Conventional MPR for 16 QAM By analyzing the general MPR values allowed for maximum output power from the above experimental result 2, MPR values for 64 QAM for multi-clustered transmission of a single carrier component wireless device may be applied as follows:

$$MPR=CEIL\{M_A, 0.5\} \quad \text{Equation 4}$$

where, $M_A$ is as follows:

$M_A$=10.0,    ;0<A≤0.1

11.75−17.5A, ;0.1<A≤0.5

3.6−1.2A,    ;0.5<A≤1.0 where A=$N_{RB\_alloc}/N_{RB\_agg}$, $N_{RB\_agg}$ refers to the number of RBs in the channel band, $N_{RB\_alloc}$ denotes the total number of RBs transmitted simultaneously, and CEIL {$M_A$, 0.5} denotes a function that rounds off $M_A$ on a per–0.5 dB basis. That is, MPR∈[2.0, 2.5 3.0 3.5 . . . , 8.5 9.0 9.5 10.0].

<Intra-Band Contiguous CA Wireless Device>

1) Single-Clustered Transmission

Single-clustered transmission is considered equally to analyze MPR values for intra-band contiguous CA of class C (maximum aggregated CBW being 40 MHz). Using the raw transmission signal of the intra band contiguous CA. CM is calculated. Results are shown in FIG. 20.

Figure 19:
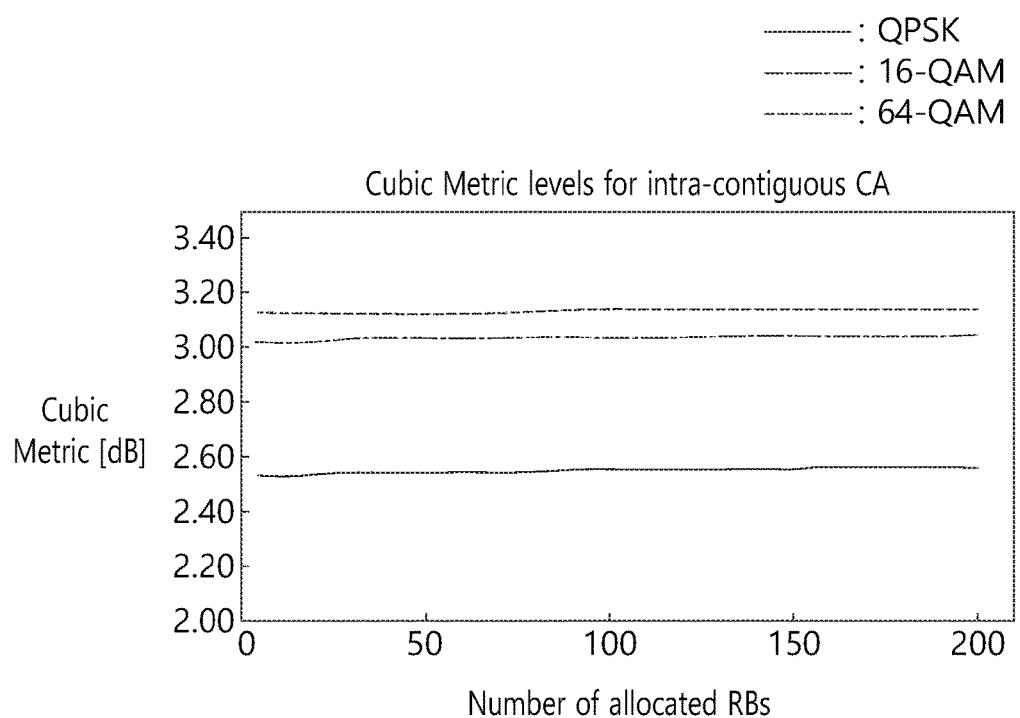
FIG. 19 is a graph showing a CM level according to the number of allocated RBs for SC-FDMA.

FIG. 19 is a graph showing a CM level according to the number of allocated RBs for SC-FDMA.

In the intra-band contiguous CA of class C, the CM according to each modulation scheme is obtained as follows:

TABLE 10

| Multiple Access Schemes | Modulation | CM [dB] | | PAPR (99.9%) [dB] | |
|---|---|---|---|---|---|
| | | 1RB | Full RBs | 1RB | Full RBs |
| SC-FDMA | QPSK | 2.53 | 2.56 | 7.32 | 7.40 |
| | 16 QAM | 3.02 | 3.04 | 8.23 | 8.28 |
| | 64 QAM | 3.14 | 3.15 | 8.69 | 8.72 |

It may be seen, based on the CM results for each modulation scheme shown in FIG. 19 and Table 10, that the CM results between 16 QAM and 64 QAM are similar.

Therefore, the MPR level required for 64 QAM for single-clustered transmission in intra-band contiguous CA may be expressed as table 11 below.

TABLE 11

| Modulation | CA bandwidth Class C | | | | | MPR (dB) |
|---|---|---|---|---|---|---|
| | 25RB + 100 RB | 50RB + 100RB | 75RB + 75RB | 75RB + 100RB | 100RB + 100RB | |
| QPSK | >8 and ≤25 | >12 and ≤50 | >16 and ≤75 | >16 and ≤75 | >18 and ≤100 | ≤1 |
| QPSK | >25 | >50 | >75 | >75 | >100 | ≤2 |
| 16 QAM/ 64 QAM | ≤8 | ≤12 | ≤16 | ≤16 | ≤18 | ≤1 |
| 16 QAM/ 64 QAM | >8 and ≤25 | >12 and ≤50 | >16 and ≤75 | >16 and ≤75 | >18 and ≤100 | ≤2 |
| 16 QAM/ 64 QAM | >25 | >50 | >75 | >75 | >100 | ≤3 |

As shown in Table 11, the MPR level required for 64 QAM for single-clustered transmission in intra-band contiguous CA may be equal to the MPR level of 16 QAM.

2) Multi-Clustered Transmission

For multi-clustered transmission in intra-band contiguous CA, the MPR mask is defined to satisfy UTRA ACLR, E-UTRA ACLR, CA R-UTRA ACLR, general SEM and general SE, as in 16 QAM. MPR level required for 64 QAM in the multi-clustered transmission is verified because determining the MPR value to limit the transmission leakage level (Tx leakage level) of the wireless device in order to satisfies the emission requirement of the adjacent channel is dominant.

Based on the RB allocation ratio A, the simulation result of the required MPR mask is as follows.

Figure 20A:
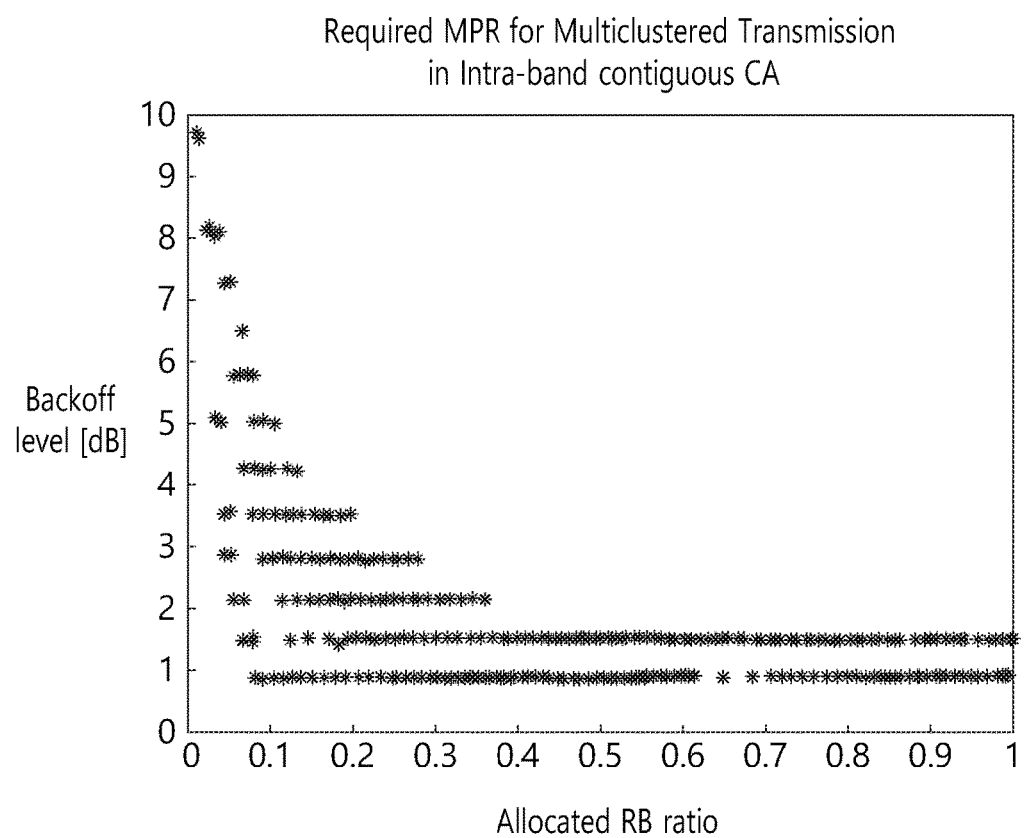
FIG. 20A shows a MPR level required for an aggregated channel bandwidth of 40 MHz.
Figure 20B:
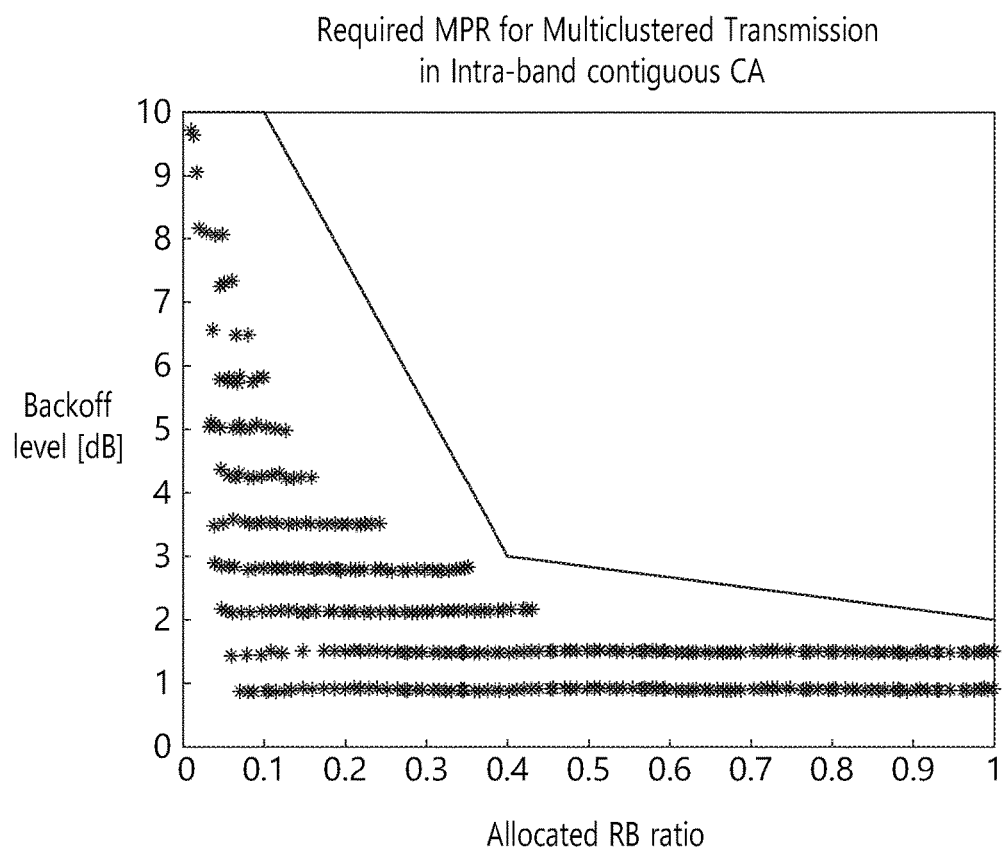
FIG. 20B shows MPR levels required to support all aggregated channel bandwidths of intra-band contiguous carrier aggregation (CA) of a class C.

FIG. 20A shows a MPR level required for an aggregated channel bandwidth of 40 MHz. FIG. 20B shows MPR levels required to support all aggregated channel bandwidths of intra-band contiguous carrier aggregation (CA) of a class C.

Based on FIG. 20A and FIG. 20B, the following experimental result 3 may be derived.

Experimental result 3: MPR level required for 64 QAM for multi-clustered transmission in intra-band contiguous CA is higher than the conventional MPR for 16 QAM.

By analyzing the general MPR values required for the 64 QAM from the above experimental result 3, MPR values for the 64 QAM for multi-clustered transmission in the intra-band contiguous carrier aggregation (CA) may be applied as follows:

$$MPR = CEIL\{M_A, 0.5\} \quad \text{Equation 5}$$

where $M_A$ is as follows:

$M_A =$ 10.0, ;0<A≤0.16
12.3−23.3A, ;0.16<A≤0.4
3.67−1.67A, ;0.4<A≤1.0 where $A = N_{RB\_alloc}/N_{RB\_agg}$, $N_{RB\_agg}$ refers to the number of RBs in the channel band, $N_{RB\_alloc}$ denotes the total number of RBs transmitted simultaneously, and CEIL {$M_A$, 0.5} denotes a function that rounds of $M_A$ on a per–0.5 dB basis. That is, MPR∈[2.0, 2.5 3.0 3.5 . . . , 8.5 9.0 9.5 10.0].

The two MPR values described above are similar to each other. The MPR under the single carrier component environment requires slightly more backoff power. Therefore, it is possible to apply different MPR values in the multi-clustered transmission environment. However, the MPR value under the single carrier component environment may be further applied with considering the worst case.

Further, MPR for 64 QAM requires up to 2 dB greater value than that for the conventional QPSK and 16 QAM modulation scheme. Therefore, the MPR value for 64 QAM may be applied only when the 64 QAM modulation scheme is applied. Further, for ease of implementation of the wireless device, the MPR common to all modulation schemes may be applied.

The proposed values are merely exemplary values derived from the simulations, and the MPR values shown in the graph may be general MPR values required in an intra-band non-contiguous CA environment. The number of RBs and RB positions may be varied within an error range.

FIG. 21 is a flowchart showing a transmission power determination method for 64 QAM according to the present disclosure, Hereinafter, it is assumed that the wireless device transmits uplink data using 64 QAM.

The wireless device determines whether transmission of the uplink data corresponds to multi-clustered transmission (S100).

If transmission of the uplink data does not correspond to multi-clustered transmission but corresponds to single-clustered transmission, the wireless device determines a MPR value to be applied for transmitting the uplink data using the 64 QAM as a MPR value to be applied for transmitting the uplink data using the 16 QAM (S200).

When transmission of the uplink data corresponds to multi-clustered transmission, the wireless device determines whether transmission of the uplink data should be performed via a carrier aggregation (CA). More specifically, the wireless device determines whether transmission of the uplink data is performed via a carrier aggregation (CA) and whether the corresponding carrier aggregation (CA) corresponds to intra band contiguous CA (S300).

When transmission of the uplink data is performed using a single carrier, the wireless device determines a first MPR value for transmitting the uplink data (S400). More specifically, the first MPR value is as described in Equation 4 above.

When transmission of the uplink data is performed via a carrier aggregation (CA), and the corresponding carrier aggregation (CA) corresponds to the intra-band contiguous CA, the wireless device determines a second MPR value for transmitting the uplink data (S500). More specifically, the second MPR value is as described in Equation 5 above.

Further, the wireless device determines a transmission power based on the determined MPR value, and transmits the uplink data using the determined transmission power (S600).

Embodiment of the present invention may be implemented through various means. For example, the embodiments of the present invention may be implemented by hardware, firmware, software, or a combination thereof.

According to hardware implementation, the method according to the embodiments of the present invention may be implemented using Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors.

According to firmware or software implementation, the method according to the embodiments of the present invention may be implemented in the form of a module, a procedure or a function to perform the above functions or operation. A software code is stored in a memory unit so that the software code may be driven by a processor. The memory unit may be located inside or outside the processor to exchange data with the processor by various know means. The wireless communication system according to an embodiment of the present invention will be described with reference to FIG. 22.

Figure 22:
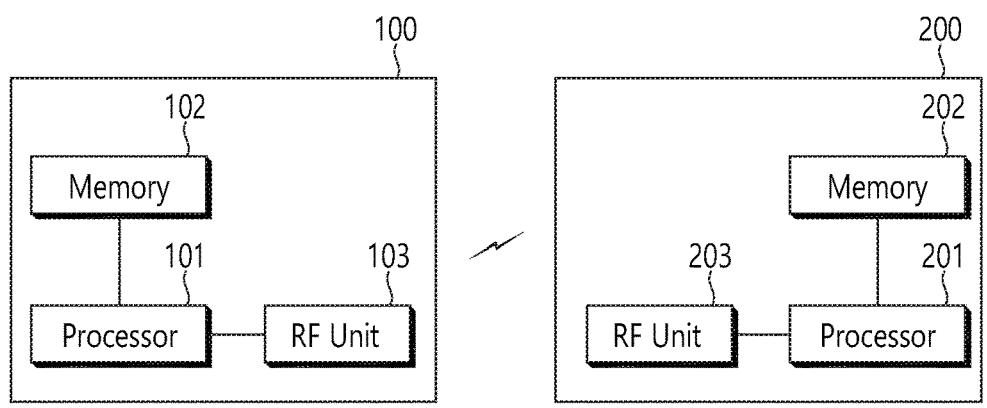
FIG. 22 is a block diagram illustrating a wireless communication system implemented according to the present disclosure.

FIG. 22 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A wireless device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 201.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for determining an uplink transmission power, the method performed by a user equipment (UE) and comprising:
   determining a maximum power reduction (MPR) value based on:
      whether 64 QAM (Quadrature Amplitude Modulation) is used for uplink data transmission,
      whether multi-clustered transmission is used for the uplink data transmission, and
      whether a single carrier is used for the uplink data transmission or a plurality of carriers using carrier aggregation (CA) is used for the uplink data transmission;
   determining the uplink transmission power based on the MPR value;
   transmitting uplink data based on the uplink transmission power,
   wherein based on that the 64 QAM, the multi-clustered transmission, and the single carrier are used for the uplink data transmission, a first MPR value is determined as the MPR value to be applied to the uplink data transmission,
   wherein based on that the 64 QAM, the multi-clustered transmission, and the plurality of carriers are used for the uplink data transmission, a second MPR value is determined as the MPR value to be applied to the uplink data transmission,
   wherein the first MPR value is determined based on CEIL $\{M_A, 0.5\}$,
   wherein, $M_A$=10.0, ; 0<A≤0.1
   11.75-17.5A, ; 0.1<A≤0.5
   3.6-1.2A, ; 0.5<A≤1.0
   wherein $A=N_{RB\_alloc}/N_{RB\_agg}$, and
   wherein $N_{RB\_agg}$ represents a number of RBs in a channel band, $N_{RB\_alloc}$ represents a total number of RBs transmitted simultaneously, and CEIL $\{M_A, 0.5\}$ represents a function that rounds off $M_A$ on a per-0.5 dB basis.

2. The method of claim 1, wherein each of the first and second MPR values is in a range of 2.0 dB to 10.0 dB based on a resource block allocation ratio.

3. The method of claim 1, wherein the second MPR value is determined based on CEIL $\{M_A, 0.5\}$,
   wherein, $M_A$=10.0, ; 0<A≤0.16
   12.3-23.3A, ; 0.16<A≤0.4
   3.67-1.67A, ; 0.4<A≤1.0.

4. The method of claim 1, wherein based on that the 64 QAM, and the single-clustered transmission are used for the uplink data transmission, a MPR value to be applied for transmission of the uplink data using 16 QAM is determined as the MPR value to be applied to the uplink data transmission using the 64 QAM.

5. The method of claim 1, wherein the first MPR and second MPR values has a power reduction level larger than a MPR value to be applied for transmission of the uplink data using 16 QAM.

6. The method of claim 1, wherein based on the plurality of carriers being aggregated via the carrier aggregation, a maximum bandwidth of the plurality of carriers is 40 MHz.

7. A user equipment (UE) for determining an uplink transmission power, the UE comprising:
   a transceiver for transmitting and receiving a wireless signal; and
   a processor operatively connected to the transceiver, wherein the processor is configured to:
   determining a maximum power reduction (MPR) value based on whether 64 QAM (Quadrature Amplitude Modulation) is used for uplink data transmission, whether multi-clustered transmission is used for the uplink data transmission, and whether a single carrier is used for the uplink data transmission or a plurality of carriers using carrier aggregation (CA) is used for the uplink data transmission;
   determine the uplink transmission power based on the MPR value;
   control the transceiver to transmit uplink data based on the uplink transmission power,
   wherein based on that the 64 QAM, the multi-clustered transmission, and the single carrier are used for the uplink data transmission, a first MPR value is determined as the MPR value to be applied to the uplink data transmission,
   wherein based on that the 64 QAM, the multi-clustered transmission, and the plurality of carriers are used for the uplink data transmission, a second MPR value is determined as the MPR value to be applied to the uplink data transmission,
   wherein the first MPR value is determined based on CEIL $\{M_A, 0.5\}$,
   wherein, $M_A$=10.0, ; 0<A≤0.1

11.75-17.5A, ; 0.1<A≤0.5
3.6-1.2A, ; 0.5<A≤1.0
wherein $A=N_{RB\_alloc}/N_{RB\_agg}$, and
wherein $N_{RB\_agg}$ represents a number of RBs in a channel band, $N_{RB\_alloc}$ represents a total number of RBs transmitted simultaneously, and CEIL $\{M_A, 0.5\}$ represents a function that rounds off $M_A$ on a per-0.5 dB basis.

8. The UE of claim 7, wherein each of the first and second MPR values is in a range of 2.0 dB to 10.0 dB based on a resource block allocation ratio.

9. The UE of claim 7, wherein the second MPR value is determined based on CEIL $\{M_A, 0.5\}$,
wherein, $M_A$=10.0, ; 0<A≤0.16
12.3-23.3A, ; 0.16<A≤0.4
3.67-1.67A, ; 0.4<A≤1.0.

10. The UE of claim 7, wherein, based on that the 64 QAM, and a single-clustered transmission are used for the uplink data transmission, a MPR value to be applied for transmission of the uplink data using 16 QAM is determined as the MPR value to be applied to the uplink data transmission using the 64 QAM.

11. The UE of claim 7, wherein the first MPR and second MPR values has a power reduction level larger than a MPR value to be applied for transmission of the uplink data using 16 QAM.

12. The UE of claim 7, wherein, based the plurality of carriers being aggregated via the carrier aggregation, a maximum bandwidth of the plurality of carriers is 40 MHz.

* * * * *